US009819949B2

(12) United States Patent
Lu et al.

(10) Patent No.: US 9,819,949 B2
(45) Date of Patent: Nov. 14, 2017

(54) HARDWARE-ACCELERATED DECODING OF SCALABLE VIDEO BITSTREAMS

(75) Inventors: Mei-Hsuan Lu, Bellevue, WA (US); Yongjun Wu, Bellevue, WA (US); Ming-Chieh Lee, Bellevue, WA (US); Gary J. Sullivan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 414 days.

(21) Appl. No.: 13/329,093

(22) Filed: Dec. 16, 2011

(65) Prior Publication Data

US 2013/0156101 A1   Jun. 20, 2013

(51) Int. Cl.
*H04N 7/50* (2006.01)
*H04N 7/26* (2006.01)
(Continued)

(52) U.S. Cl.
CPC ............ *H04N 19/42* (2014.11); *H04N 19/30* (2014.11); *H04N 19/44* (2014.11); *H04N 19/423* (2014.11); *H04N 19/436* (2014.11)

(58) Field of Classification Search
CPC .......... H04B 1/66; H03M 13/00; H03M 7/00; H04N 19/00; H04N 7/00; H04N 11/00
See application file for complete search history.

(56) References Cited

U.S. PATENT DOCUMENTS

| 4,309,754 A | 1/1982 | Dinwiddie, Jr. |
| 4,642,756 A | 2/1987 | Sherrod |

(Continued)

FOREIGN PATENT DOCUMENTS

| CN | 1366775 | 8/2002 |
| CN | 1960472 | 5/2007 |

(Continued)

OTHER PUBLICATIONS

3rd Generation Partnership Project, "Multimedia telephony over IP Multimedia Subsystem (IMS); Optimization opportunities (Release 7)," 3GPP Technical Report TR 26.914 V7.0.0, 18 pp. (Mar. 2006).

(Continued)

*Primary Examiner* — Gims Philippe
*Assistant Examiner* — Maryam Nasri
(74) *Attorney, Agent, or Firm* — Klarquist Sparkman, LLP

(57) ABSTRACT

In various respects, hardware-accelerated decoding is adapted for decoding of video that has been encoded using scalable video coding. For example, for a given picture to be decoded, a host decoder determines whether a corresponding base picture will be stored for use as a reference picture. If so, the host decoder directs decoding with an accelerator such that the some of the same decoding operations can be used for the given picture and the reference base picture. Or, as another example, the host decoder groups encoded data associated with a given layer representation in buffers. The host decoder provides the encoded data for the layer to the accelerator. The host decoder repeats the process layer-after-layer in the order that layers appear in the bitstream, according to a defined call pattern for an acceleration interface, which helps the accelerator determine the layers with which buffers are associated.

29 Claims, 8 Drawing Sheets software 180 implementing one or more innovations for hardware-acceleration decoding of scalable video bitstreams

(51) Int. Cl.
*H04N 7/12* (2006.01)
*H04N 19/42* (2014.01)
*H04N 19/30* (2014.01)
*H04N 19/44* (2014.01)
*H04N 19/423* (2014.01)
*H04N 19/436* (2014.01)

(56) References Cited

U.S. PATENT DOCUMENTS

| | | |
|---|---|---|
| 5,465,335 A | 11/1995 | Anderson |
| 5,694,179 A | 12/1997 | Kwak et al. |
| 5,734,783 A | 3/1998 | Shimoda et al. |
| 5,909,559 A | 6/1999 | So |
| 6,002,801 A | 12/1999 | Strongin et al. |
| 6,006,303 A | 12/1999 | Barnaby et al. |
| 6,105,048 A | 8/2000 | He |
| 6,219,502 B1 | 4/2001 | Osari et al. |
| 6,249,288 B1 | 6/2001 | Campbell |
| 6,278,691 B1 | 8/2001 | Ohyama et al. |
| 6,298,166 B1 | 10/2001 | Ratnakar et al. |
| 6,427,058 B1 | 7/2002 | Akiba et al. |
| 6,438,169 B1 | 8/2002 | Takashima et al. |
| 6,445,314 B1 | 9/2002 | Zhang et al. |
| 6,574,279 B1 | 6/2003 | Vetro et al. |
| 6,782,368 B2 | 8/2004 | Fujii et al. |
| 6,823,016 B1 | 11/2004 | Nguyen et al. |
| 6,963,347 B1 | 11/2005 | Selvaggi et al. |
| 7,043,088 B2 | 5/2006 | Chiu et al. |
| 7,072,404 B2 | 7/2006 | Itokawa |
| 7,085,322 B2 | 8/2006 | Ngai et al. |
| 7,099,389 B1 | 8/2006 | Yu et al. |
| 7,116,714 B2 | 10/2006 | Hannuksela |
| 7,130,526 B2 | 10/2006 | Abelard et al. |
| 7,289,047 B2 | 10/2007 | Nagori |
| 7,366,236 B1 | 4/2008 | Winger |
| 7,370,325 B1 | 5/2008 | Hull et al. |
| 7,499,960 B2 | 3/2009 | Dageville et al. |
| 7,573,407 B2 | 8/2009 | Reznik |
| 7,653,128 B2 | 1/2010 | Shibata et al. |
| 7,735,087 B2 | 6/2010 | Hayashi |
| 7,817,723 B2 | 10/2010 | Wiegand et al. |
| 7,889,788 B2 | 2/2011 | Toma et al. |
| 8,213,518 B1 | 7/2012 | Wang et al. |
| 8,291,448 B2 | 10/2012 | Pekonen et al. |
| 8,396,082 B2 | 3/2013 | Hannuksela et al. |
| 8,675,729 B2 | 3/2014 | Kadono et al. |
| 2002/0036707 A1 | 3/2002 | Gu |
| 2002/0076115 A1 | 6/2002 | Leeder et al. |
| 2003/0058949 A1 | 3/2003 | MacInnis et al. |
| 2003/0161405 A1 | 8/2003 | Howard |
| 2003/0185298 A1 | 10/2003 | Alvarez et al. |
| 2003/0189982 A1 | 10/2003 | MacInnis |
| 2003/0210163 A1 | 11/2003 | Yang |
| 2003/0235251 A1 | 12/2003 | Hsiun et al. |
| 2004/0047512 A1 | 3/2004 | Handley et al. |
| 2004/0117427 A1 | 6/2004 | Allen et al. |
| 2004/0146109 A1 | 7/2004 | Kondo et al. |
| 2004/0190617 A1 | 9/2004 | Shen et al. |
| 2004/0208245 A1 | 10/2004 | MacInnis et al. |
| 2004/0240743 A1 | 12/2004 | Hamada et al. |
| 2005/0013362 A1 | 1/2005 | Pearson et al. |
| 2005/0047666 A1 | 3/2005 | Mitchell et al. |
| 2005/0053157 A1 | 3/2005 | Lillevold |
| 2005/0053295 A1 | 3/2005 | Holcomb |
| 2005/0053300 A1 | 3/2005 | Mukerjee |
| 2005/0068208 A1 | 3/2005 | Liang et al. |
| 2005/0123207 A1 | 6/2005 | Marpe et al. |
| 2005/0169374 A1 | 8/2005 | Marpe et al. |
| 2005/0175091 A1 | 8/2005 | Puri et al. |
| 2005/0179568 A1* | 8/2005 | Wee et al. ............... 341/50 |
| 2005/0180511 A1 | 8/2005 | Arafune et al. |
| 2005/0220190 A1 | 10/2005 | Ha et al. |
| 2005/0289505 A1 | 12/2005 | Williams |
| 2006/0002479 A1 | 1/2006 | Fernandes |
| 2006/0013320 A1 | 1/2006 | Oguz |
| 2006/0056513 A1 | 3/2006 | Shen et al. |
| 2006/0056517 A1 | 3/2006 | MacInnis et al. |
| 2006/0056708 A1 | 3/2006 | Shen et al. |
| 2006/0088286 A1 | 4/2006 | Shibata et al. |
| 2006/0098734 A1 | 5/2006 | Cho et al. |
| 2006/0114995 A1 | 6/2006 | Robey et al. |
| 2006/0126726 A1 | 6/2006 | Lin et al. |
| 2006/0126744 A1 | 6/2006 | Peng et al. |
| 2006/0133479 A1 | 6/2006 | Chen et al. |
| 2006/0133507 A1 | 6/2006 | Lim et al. |
| 2006/0133770 A1 | 6/2006 | Shibata et al. |
| 2006/0140271 A1 | 6/2006 | Wedi et al. |
| 2006/0193383 A1 | 8/2006 | Alvarez et al. |
| 2006/0204119 A1 | 9/2006 | Feng et al. |
| 2006/0215754 A1 | 9/2006 | Buxton et al. |
| 2006/0222254 A1 | 10/2006 | Zandi et al. |
| 2006/0227872 A1 | 10/2006 | Mori et al. |
| 2006/0230162 A1* | 10/2006 | Chen ................. H04N 19/36 709/229 |
| 2006/0233525 A1 | 10/2006 | Shibata et al. |
| 2006/0239343 A1 | 10/2006 | Mohsenian |
| 2006/0245498 A1 | 11/2006 | Lee et al. |
| 2006/0248516 A1 | 11/2006 | Gordon |
| 2006/0267976 A1 | 11/2006 | Saito et al. |
| 2006/0285594 A1 | 12/2006 | Kim et al. |
| 2007/0030899 A1 | 2/2007 | Iguchi et al. |
| 2007/0030911 A1 | 2/2007 | Yoon |
| 2007/0033494 A1* | 2/2007 | Wenger et al. ............... 714/776 |
| 2007/0036223 A1 | 2/2007 | Srinivasan |
| 2007/0071095 A1 | 3/2007 | Lim |
| 2007/0098068 A1 | 5/2007 | Kimata et al. |
| 2007/0116426 A1 | 5/2007 | Toma et al. |
| 2007/0120711 A1 | 5/2007 | Hu et al. |
| 2007/0120867 A1 | 5/2007 | Shastry et al. |
| 2007/0121728 A1 | 5/2007 | Wang et al. |
| 2007/0124733 A1 | 5/2007 | Bril et al. |
| 2007/0126853 A1 | 6/2007 | Ridge et al. |
| 2007/0160151 A1 | 7/2007 | Bolton et al. |
| 2007/0177668 A1 | 8/2007 | Park et al. |
| 2007/0183491 A1 | 8/2007 | Pearson et al. |
| 2007/0183507 A1 | 8/2007 | Maheshwari et al. |
| 2007/0201562 A1 | 8/2007 | Ganesh et al. |
| 2007/0223595 A1 | 9/2007 | Hannuksela et al. |
| 2007/0230582 A1 | 10/2007 | Chiu et al. |
| 2007/0230584 A1 | 10/2007 | Chiu et al. |
| 2007/0233989 A1 | 10/2007 | Garcia-Arellano et al. |
| 2007/0286276 A1 | 12/2007 | Gartner et al. |
| 2007/0291857 A1* | 12/2007 | Hussain ............... 375/240.29 |
| 2007/0297501 A1 | 12/2007 | Hussain et al. |
| 2008/0002773 A1 | 1/2008 | Lai |
| 2008/0013620 A1 | 1/2008 | Hannuksela et al. |
| 2008/0048894 A1 | 2/2008 | Ridge et al. |
| 2008/0107184 A1 | 5/2008 | Katsavounidis et al. |
| 2008/0123736 A1 | 5/2008 | Sekiguchi et al. |
| 2008/0137736 A1 | 6/2008 | Richardson et al. |
| 2008/0159408 A1 | 7/2008 | Degtyarenko |
| 2008/0181308 A1 | 7/2008 | Wang et al. |
| 2008/0187053 A1 | 8/2008 | Zhao et al. |
| 2008/0212676 A1 | 9/2008 | Liu et al. |
| 2008/0285642 A1 | 11/2008 | Jahanghir et al. |
| 2008/0304520 A1 | 12/2008 | Hannuksela et al. |
| 2009/0002379 A1 | 1/2009 | Baeza et al. |
| 2009/0003446 A1 | 1/2009 | Wu et al. |
| 2009/0003447 A1 | 1/2009 | Christoffersen et al. |
| 2009/0003451 A1 | 1/2009 | Lin et al. |
| 2009/0010337 A1 | 1/2009 | Wang |
| 2009/0010338 A1 | 1/2009 | Wang |
| 2009/0109988 A1 | 4/2009 | Musunuri et al. |
| 2009/0122864 A1 | 5/2009 | Palfner et al. |
| 2009/0147859 A1 | 6/2009 | McGowan et al. |
| 2009/0175548 A1 | 7/2009 | Fukuhara et al. |
| 2010/0008418 A1 | 1/2010 | Wu et al. |
| 2010/0061643 A1 | 3/2010 | Fukuhara et al. |
| 2010/0158135 A1 | 6/2010 | Yin et al. |
| 2010/0189182 A1 | 7/2010 | Hannuksela |
| 2010/0195721 A1 | 8/2010 | Wu et al. |
| 2011/0064137 A1 | 3/2011 | Han et al. |

(56) References Cited

U.S. PATENT DOCUMENTS

| | | | |
|---|---|---|---|
| 2011/0206131 A1 | 8/2011 | Vafin et al. | |
| 2011/0295820 A1 | 12/2011 | Volkoff et al. | |
| 2012/0054463 A1 | 3/2012 | Poyarekar | |

FOREIGN PATENT DOCUMENTS

| | | |
|---|---|---|
| CN | 101051465 | 10/2007 |
| CN | 101313585 | 11/2008 |
| CN | 101569170 | 10/2009 |
| EP | 0 909 094 | 4/1999 |
| EP | 1 195 992 | 4/2002 |
| WO | WO 2006/096612 | 9/2006 |
| WO | WO 2006/134110 | 12/2006 |

OTHER PUBLICATIONS

Akramullah et al., "Parallelization of MPEG-2 Video Encoder for Parallel and Distributed Computing Systems," IEEE, pp. 834-837 (Aug. 1995).
ATI Technologies, Inc., "Introduction to H.264," 6 pp. (month unknown, 2005).
Azevedo et al., "A Highly Scalable Parallel Implementation of H.264," Transactions on High-Performance Embedded Architectures and Compilers, 25 pp. (Sep. 2009).
Chen et al., "Implementation of H.264 Encoder and Decoder on Personal Computers," Journal of Visual Comm. and Image Representation, 19 pp. (Apr. 2006).
Chen, "Synchronization and Control of Multi-threads for MPEG-4 Video Decoder," IEEE 1999 Int'l Conf. on Consumer Electronics, pp. 298-299 (Jun. 1999).
Dawson, "Coding for Multiple Cores on Xbox 360 and Microsoft Windows," 8 pp. (Aug. 2006) [Downloaded from the Internet on Jan. 22, 2007].
De Neve et al., "Real-Time BSD-driven Adaptation Along the Temporal Axis of H.264/AVC Bitstreams," Advances in Multimedia Information Processing, pp. 131-140 (2006).
Duffy, "CLR Inside Out: Using Concurrency for Scalability," MSDN Magazine, 11 pp. (Sep. 2006) [Downloaded from the Internet on Jan. 22, 2007].
Foldoc.org, "priority scheduling," 1 p. (No date) [Downloaded from the Internet on Jan. 26, 2007].
Foldoc.org, "multitasking," 1 p. (Document dated Apr. 24, 1998) [Downloaded from the Internet on Jan. 26, 2007].
Gerber et al., "Optimizing Video Encoding using Threads and Parallelism: Part 1—Threading a video codec," 3 pp., downloaded from Embedded.com, (Dec. 2009).
Huang et al., "Joint Algorithm/Code-Level Optimization of H.264 Video Decoder for Mobile Multimedia Applications," ICASSP, pp. 2189-2192 (Mar. 2008).
Intel Corp., "Intel's Next Generation Integrated Graphics Architecture—Intel® Graphics Media Accelerator X3000 and 3000," 14 pp. (Jul. 2006).
ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).
ISO/IEC, "Text of ISO/IEC FCD 29199-2 (JPEG XR image coding—Specification)," ISO/IEC JTC 1/SC 29/WG 11 N4739, 173 pp. (Sep. 2008).
ISO/IEC, "Digital Compression and Coding of Continuous-tone Still Images," ISO DIS 10918-1, CCITT Recommendation T.81, 211 pp. (1992).
ITU, "Advanced video coding for generic audiovisual services," Recommendation ITU-T H.264, 676 pp. (Mar. 2010).
Jacobs et al., "Thread-Parallel MPEG-2, MPEG-4 and H.264 Video Encoders for SoC Multi-Processor Architectures," IEEE Trans. On Consumer Electronics, vol. 52, No. 1, pp. 269-275 (Feb. 2006).
Joint Collaborative Team on Video Coding, "Description of video coding technology proposal by Texas Instruments Inc.," JCTVC-A101, 45 pp. (Apr. 2010).
Kim et al., "Multi-thread VLIW processor architecture for HDTV decoding," IEEE 2000 Custom Integrated Circuits Conf., pp. 559-562 (May 2000).
Loomis et al., "VC-1 Technical Overview," 7 pp. (Apr. 2006) [Downloaded from the Internet on Jan. 24, 2007].
Marpe et al., "A Fast Renormalization Technique for H.264/MPEG4-AVC Arithmetic Coding," 14 pp. (2006).
Murata et al., "Fast 2D IDCT Implementation with Multimedia Instructions for a Software MPEG2 Decoder," Int'l Conf. on Acoustics, Speech, and Signal Processing, vol. 5, pp. 3105-3108 (May 1998).
Narasimhan, "Contributions to Carriage of AVC in MPEG-2," ISO/IEC/JTC1/SC29/WG11, MPEG2003/m9448, 12 pp. (2003).
Oehring et al., "MPEG-2 Video Decompression on Simultaneous Multithreaded Multimedia," Int. Conf. on Parallel Architectures and Compilation Techniques (PACT '99), Newport Beach, CA (Oct. 1999).
Ostermann et al., "Video Coding with H.264/AVC: Tools, Performance, and Complexity," IEEE Circuits and Systems Magazine, pp. 7-28 (Aug. 2004).
Prada-Rojas et al,. "Towards a Component-based Observation of MPSoC," IEEE, pp. 542-549 (Sep. 2009).
Richardson, H.264 and MPEG-4 Video Compression: Video Coding for Next-generation Multimedia, Chapter 6, "H.264/MPEG4 Part 10," pp. 159-223 (Aug. 2003).
Sambe et al., "High-speed Distributed Video Transcoding for Multiple Rates and Formats," IEICE Trans on Information and Systems, vol. E88-D, Issue 8, pp. 1923-1931 (Aug. 2005).
SMPTE, "Proposed SMPTE Standard for Television: VC-1 Compressed Video Bitstream Format and Decoding Process," SMPTE 421M, pp. i-xx, 5-7, 23-27 (Aug. 2005).
SMPTE, "VC-1 Compressed Video Bitstream Format and Decoding Process," SMPTE 421M-2006, 493 pp. (Feb. 2006).
Sullivan et al., "Microsoft DirectX VA: Video Acceleration API/DDI," 88 pp. (2001).
Van Der Tol et al., "Mapping of MPEG-4 decoding on a flexible architecture platform," Proceedings of the SPIE, Media Processors, vol. 4674, 13 pp. (Jan. 2002).
Van Der Tol et al., "Mapping of H.264 decoding on a multiprocessor architecture," Proceedings of the SPIE, vol. 5022, pp. 707-718 (May 2003).
Wang, "H.264 Baseline Video Implementation on the CT3400 Multi-core DSP," Cradle Technologies, 15 pp. (2006).
Wang, "[Mp4-tech] [H.264] output timing, bumping process, missing HRD parameters," downloaded from World Wide Web, 3 pp. (document marked May 5, 2006).
Wikipedia, "Motion JPEG," 4 pp., downloaded from the World Wide Web on Dec. 29, 2010.
Yadav et al., "Software-only Multiple Variable Length Decoding for Real-Time Video on MDSP," Int'l Conf. on Consumer Electronics, pp. 141-142 (Jan. 2005).
Youssef, "JPEG and MPEG Standards," 14 pp., downloaded from the World Wide Web on Dec. 29, 2010.
MainConcept, "MainConcept™ Showcase 2.8," 4 pp. (downloaded from the World Wide Web on Apr. 6, 2011).
Schwarz et al., "Overview of the Scalable H.264/MPEG4-AVC Extension," IEEE Int'l Conf. on Image Processing, pp. 161-164 (Oct. 2006).
Segall et al., "Spatial Scalability Within the H.264/AVC Scalable Video Coding Extension," IEEE Trans. on Circuits and Systems for Video Technology, vol. 17, No. 9, pp. 1121-1135 (Sep. 2007).
Sullivan, "DirectX Video Acceleration Specification for H.264/AVC Decoding," 66 pp. (Dec. 2007—updated Dec. 2010).
Sullivan et al., "DirectX Video Acceleration Specification for H.264/MPEG-4 AVC Multiview Video Coding (MVC), Including the Stereo High Profile," 17 pp. (Mar. 2011).
Wiegand et al., "Introduction to the Special Issue on Scalable Video Coding—Standardization and Beyond," IEEE Trans. on Circuits and Systems for Video Technology, vol. 17, No. 9, pp. 1099-1102 (Sep. 2007).

(56) References Cited

OTHER PUBLICATIONS

Wong et al., "Task concurrency management methodology to schedule the MPEG4 IM1 player on a highly parallel processor platform," *Proc. of the Ninth Int'l Symp. on Hardware/Software Codesign*, pp. 170-175 (Apr. 2001).
U.S. Appl. No. 11/703,613.
U.S. Appl. No. 13/848,631.
U.S. Appl. No. 14/266,609.
U.S. Appl. No. 11/824,563.
U.S. Appl. No. 11/824,508.
U.S. Appl. No. 14/100,661.
U.S. Appl. No. 14/100,750.
U.S. Appl. No. 13/929,573.
U.S. Appl. No. 12/966,914.
U.S. Appl. No. 12/978,501.
U.S. Appl. No. 13/223,079.
U.S. Appl. No. 14/256,351.
U.S. Appl. No. 13/329,093.

\* cited by examiner software 180 implementing one or more innovations for hardware-acceleration decoding of scalable video bitstreams

Figure 9a  900

```
typedef struct _DXVA_PicParams_H264_SVC {

(all the parameters of the Section 4.0 Picture Parameters Data
Structure, followed by the following additional parameters)

UCHAR   RefBasePicFlag[16];
  union {
    struct {
      USHORT  inter_layer_deblocking_filter_control_present_flag : 1;
      USHORT  chroma_phase_x_plus1_flag : 1;
      USHORT  seq_ref_layer_chroma_phase_x_plus1_flag : 1;
      USHORT  adaptive_tcoeff_level_prediction_flag : 1;
      USHORT  slice_header_restriction_flag : 1;
      USHORT  store_ref_base_pic_flag : 1;
      USHORT  ShiftXYis16Flag : 1;
      USHORT  constrained_intra_resampling_flag : 1;
      USHORT  ref_layer_chroma_phase_x_plus1_flag : 1;
      USHORT  tcoeff_level_prediction_flag : 1;
      USHORT  IdrPicFlag : 1;
      USHORT  NextLayerSpatialResolutionChangeFlag : 1;
      USHORT  NextLayerMaxTCoeffLevelPredFlag : 1;
    }
    USHORT  wBitFields;
  };

UCHAR   extended_spatial_scalability_idc;
  UCHAR   chroma_phase_y_plus1;
  union {
    struct {
      SHORT   seq_scaled_ref_layer_left_offset;
      SHORT   seq_scaled_ref_layer_top_offset;
      SHORT   seq_scaled_ref_layer_right_offset;
      SHORT   seq_scaled_ref_layer_bottom_offset;
    };
    struct {
      SHORT   scaled_ref_layer_left_offset;
      SHORT   scaled_ref_layer_top_offset;
      SHORT   scaled_ref_layer_right_offset;
      SHORT   scaled_ref_layer_bottom_offset;
    };
  };
```

Figure 9b     900 (cont.)

```
UCHAR   seq_ref_layer_chroma_phase_y_plus1;

UCHAR   LayerType;
UCHAR   dependency_id;
UCHAR   quality_id;
USHORT  ref_layer_dq_id;
UCHAR   disable_inter_layer_deblocking_filter_idc;
CHAR    inter_layer_slice_alpha_c0_offset_div2;
CHAR    inter_layer_slice_beta_offset_div2;
UCHAR   ref_layer_chroma_phase_y_plus1;

SHORT   NextLayerScaledRefLayerLeftOffset;
SHORT   NextLayerScaledRefLayerRightOffset;
SHORT   NextLayerScaledRefLayerTopOffset;
SHORT   NextLayerScaledRefLayerBottomOffset;
USHORT  NextLayerPicWidthInMbs;
USHORT  NextLayerPicHeightInMbs;
UCHAR   NextLayerDisableInterLayerDeblockingFilterIdc;
UCHAR   NextLayerInterLayerSliceAlphaC0OffsetDiv2;
UCHAR   NextLayerInterLayerSliceBetaOffsetDiv2;

UCHAR   DeblockingFilterMode;

} DXVA_PicParams_H264_SVC, *LPDXVA_PicParams_H264_SVC;
```

Figure 10   1000

```
typedef struct _DXVA_Slice_H264_SVC_Long {

(all the parameters of the Section 6.1 Long Slice Control Data
Structure, followed by the following additional parameters)

union {
     struct {
       USHORT  no_inter_layer_pred_flag : 1;
       USHORT  base_pred_weight_table_flag : 1;
       USHORT  slice_skip_flag : 1;
       USHORT  adaptive_base_mode_flag : 1;
       USHORT  default_base_mode_flag : 1;
       USHORT  adaptive_motion_prediction_flag : 1;
       USHORT  default_motion_prediction_flag : 1;
       USHORT  adaptive_residual_prediction_flag : 1;
       USHORT  default_residual_prediction_flag : 1;
     }
     USHORT wBitFields;
   };
   USHORT  num_mbs_in_slice_minus1;
   UCHAR   scan_idx_start;
   UCHAR   scan_idx_end;

} DXVA_Slice_H264_SVC_Long, *LPDXVA_Slice_H264_SVC_Long;
```

Figure 11   1100

```
typedef struct _DXVA_Slice_H264_SVC_Short {

(all the parameters of the Section 6.1 Short Slice Control Data
Structure, followed by the following additional parameters)
     struct {
       USHORT  no_inter_layer_pred_flag : 1;
     }
     USHORT wBitFields;
   };

} DXVA_Slice_H264_SVC_Short, *LPDXVA_Slice_H264_SVC_Short;
```

HARDWARE-ACCELERATED DECODING OF SCALABLE VIDEO BITSTREAMS

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (MPEG-4 AVC or ISO/IEC 14496-10) standards and the MPEG-1 (ISO/IEC 11172-2), MPEG-4 Visual (ISO/IEC 14496-2) and SMPTE 421M standards. In particular, decoding according to the H.264 standard is widely used in game consoles and media players to play back encoded video. H.264 decoding is also widely used in set-top boxes, personal computers, smartphones and other mobile computing devices for playback of encoded video streamed over the Internet or other networks. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

Several factors affect quality of video information, including spatial resolution, frame rate and distortion. Spatial resolution generally refers to the number of samples in a video image. Images with higher spatial resolution tend to look crisper than other images and contain more discernable details. Frame rate is a common term for temporal resolution for video. Video with higher frame rate tends to mimic the smooth motion of natural objects better than other video, and can similarly be considered to contain more detail in the temporal dimension. During encoding, an encoder can selectively introduce distortion to reduce bit rate, usually by quantizing video information during encoding. If an encoder introduces little distortion, the encoder maintains quality at the cost of higher bit rate. An encoder can introduce more distortion to reduce bit rate, but quality typically suffers. For these factors, the tradeoff for high quality is the cost of storing and transmitting the information in terms of bit rate.

When encoded video is delivered over the Internet to set-top boxes, mobile computing devices or personal computers, one video source can provide encoded video to multiple receiver devices. Or, in a videoconference, one device may deliver encoded video to multiple receiver devices. Different receiver devices may have different screen sizes or computational capabilities, with some devices able to decode and play back high quality video, and other devices only able to play back lower quality video. Also, different receiver devices may use network connections having different bandwidths, with some devices able to receive higher bit rate (higher quality) encoded video, and other devices only able to receive lower bit rate (lower quality) encoded video.

Scalable video coding and decoding provide one way to deliver different versions of video at different levels of distortion, temporal quality and/or spatial resolution quality. With scalable video coding, an encoder splits video into a base layer and one or more enhancement layers. The base layer alone provides a reconstruction of the video at a lower quality level (e.g., lower frame rate, lower spatial resolution and/or higher distortion). One or more enhancement layers can be decoded along with the base layer video data to provide a reconstruction with increased video quality in terms of higher frame rate, higher spatial resolution and/or lower distortion. Scalability in terms of distortion is sometimes called signal-to-noise ratio ("SNR") scalability. A receiver device can receive a scalable video bitstream and decode those parts of it appropriate for the receiver device, which may the base layer video only, the base layer video plus some of the enhancement layer video, or the base layer video plus all enhancement layer video. Or, a video source, media server or given receiver device can select an appropriate version of video for delivery to the receiver device, considering available network bandwidth, screen size, computational capabilities, or another characteristic of the receiver device, and deliver only layers for that version of the video to the receiver device.

While some video decoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video).

Thus, some decoders use hardware acceleration to offload certain computationally intensive operations to a graphics processor or other special-purpose hardware. For example, in some configurations, a computer system includes a primary central processing unit ("CPU") as well as a graphics processing unit ("GPU") or other hardware specially adapted for graphics processing or video decoding. A decoder uses the primary CPU as a host decoder to control overall decoding and uses the GPU to perform operations that collectively require extensive computation, accomplishing video acceleration. In a typical software architecture for hardware-accelerated video decoding, a host decoder controls overall decoding and may perform some operations such as bitstream parsing using the CPU. The decoder signals control information (e.g., picture parameters, slice parameters) and encoded data to a device driver for an accelerator (e.g., with GPU) across an acceleration interface. Some existing hardware acceleration architectures are adapted for decoding non-scalable bitstreams, but they do not sufficiently address the requirements of hardware-accelerated decoding of video encoded using scalable video coding.

SUMMARY

In summary, innovations described herein improve the performance of hardware-accelerated decoding of scalable video bitstreams. In the context of the interface between a host decoder and accelerator, the innovations address various aspects of decoding of video encoded using scalable video coding.

According to a first aspect of the innovations described herein, a host decoder directs decoding of a picture and corresponding reference base picture, which is to be stored for use as a reference picture. The host decoder receives at least part of a bitstream for video data having been encoded using scalable video coding, and the bitstream includes encoded data for a given picture to be decoded for output. The given picture has a reference base picture to be stored for use as a reference picture. The host decoder calls an acceleration interface to direct decoding of the given picture and decoding of the reference base picture by the accelerator. In doing so, the host decoder interleaves at least some calls for the decoding of the reference base picture with at least some calls for the decoding of the given picture. In this way, the host decoder facilitates recognition by the accelerator of opportunities to share operations between the decoding of the reference base picture and the decoding of the given picture.

For example, the host decoder calls a first routine to signal initiation of the decoding of the reference base picture. The host decoder also calls the first routine to signal initiation of the decoding of the given picture. Then, the host decoder calls a second routine one or more times to signal that at least some of the encoded data for the given picture is accessible to the accelerator. The host decoder calls a third routine to signal that encoded data to be used in the decoding of the reference base picture has been provided, and the decoder calls the third routine to signal that encoded data to be used in the decoding of the given picture has been provided.

According to a second aspect of the innovations described herein, an accelerator decodes a picture and corresponding reference base picture, which is to be stored for use as a reference picture. Signals are received for interleaved calls to decode the given picture and the reference base picture. The accelerator performs decoding operations for the given picture and the reference base picture, sharing at least some of the decoding operations between the given picture and the reference base picture.

According to a third aspect of the innovations described herein, a host decoder directs decoding operations for a picture having encoded data in multiple layers in coded order in a bitstream. For example, the multiple layers include a target layer, reference layer, and one or more other layers used for inter-layer prediction. For each layer, the host decoder provides encoded data to an acceleration interface. For example, the multiple buffers include a picture parameters buffer, a slice control buffer and one or more bitstream data buffers. The encoded data for the layer is grouped in multiple buffers accessible to the accelerator. The host decoder repeats this process, layer-after-layer, for the multiple layers in coded order.

According to a fourth aspect of the innovations described herein, an accelerator performs video decoding operations for a picture having encoded data in multiple layers in coded order in a bitstream. For each layer, the accelerator receives encoded data for the layer from a host decoder. The encoded data for the layer is grouped in multiple buffers accessible to the accelerator, and the encoded data is received in the multiple buffers layer-after-layer in the coded order. The accelerator then performs video decoding operations using the encoded data for the picture.

According to a fifth aspect of the innovations described herein, a host decoder receives units of encoded data for video having been encoded using scalable video coding with multiple layers. The host decoder detects loss of units of encoded data used for reconstruction of a target layer. In response, the host decoder changes the target layer for at least some of the received units of encoded data. For example, the host decoder alters layer type syntax elements in units of encoded data. The host decoder provides the units of encoded data with the changed target layer to an accelerator.

The foregoing and other objects, features, and advantages of the invention will become more apparent from the following detailed description, which proceeds with reference to the accompanying figures.

BRIEF DESCRIPTION OF THE DRAWINGS

FIGS. 9a, 9b, 10 and 11 are pseudocode listings of example data structures for picture parameters and slice control parameters in hardware-accelerated decoding of video encoded using scalable video coding.

DETAILED DESCRIPTION

Figure 1:
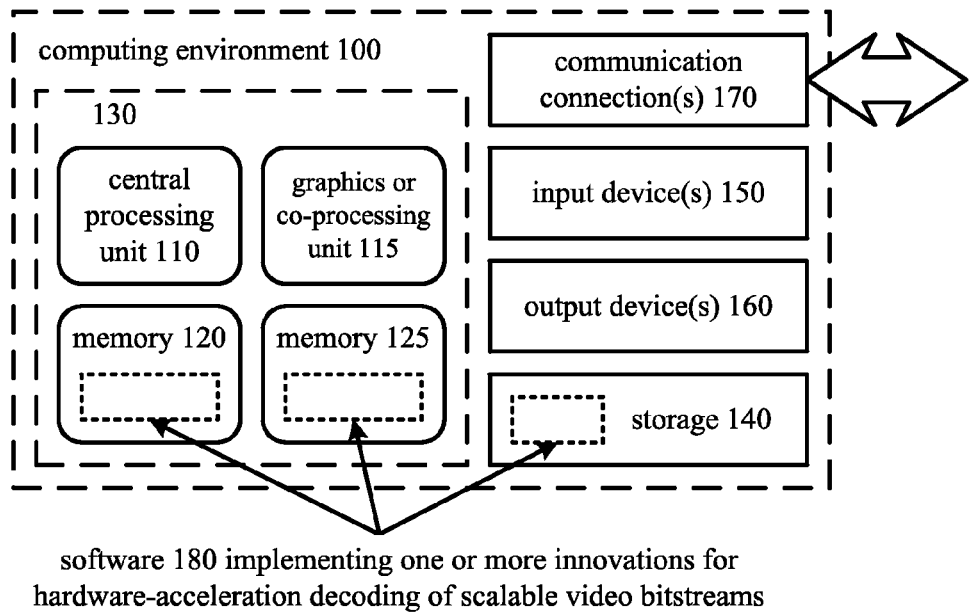
FIG. 1 is a diagram of an example computing system in which some described innovations can be implemented.

Innovations described herein relate to aspects of hardware-accelerated decoding of scalable video bitstreams. Compared to hardware-accelerated decoding of ordinary, non-scalable bitstreams, in several respects the hardware-accelerated decoding of scalable video bitstreams is adapted for decoding of video encoded using scalable video coding. For example, for a given picture to be decoded, the host decoder decides whether a corresponding base picture will be stored for use as a reference picture. If so, the host decoder directs decoding with the accelerator such that some of the same decoding operations can be used for the given picture and the reference base picture. Or, as another example, the host decoder groups encoded data associated with a given layer representation in buffers. The host decoder provides the encoded data for the layer to the accelerator. The host decoder repeats the process layer-after-layer in the order that layers appear in the bitstream, according to a defined call pattern for an acceleration interface, which helps the accelerator determine the layers with which buffers are associated.

In some examples described herein, the scalable video bitstreams comply with the H.264 standard. In an H.264 bitstream, the bitstream includes network abstraction layer ("NAL") units, and syntax elements comport with H.264 syntax and semantics. Innovations described herein can be used for hardware-accelerated decoding of H.264 video.

Innovations described herein can also be used for hardware-accelerated decoding of encoded video conformant to another standard or format. For example, innovations described herein can be used to provide hardware-accelerated decoding for VP6, VP8, SMPTE 421M or another format, or scalable video coding extensions thereof.

In some examples described herein, hardware-accelerated decoding of scalable video bitstreams generally follows the approach of DirectX Video Acceleration ("DXVA") for AVC decoding, re-using call patterns, basic data flows, data structures, etc. where possible, and otherwise extending such call patterns, basic data flows, data structures, etc. This provides consistency for vendors who have already implemented solutions for DXVA decoding of AVC bitstreams. Alternatively, innovations described herein are implemented for hardware—accelerated decoding according to another specification of the interface between host decoder and accelerator.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of hardware-accelerated decoding can be used in combination or separately. Different embodiments use one or more of the described innovations. Some of the innovations described herein address one or more of the problems noted in the background. Typically, a given innovation does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for hardware-accelerated decoding of scalable video bitstreams, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for hardware-accelerated decoding of scalable video bitstreams.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Architecture for Hardware-Accelerated Decoding

Figure 2:
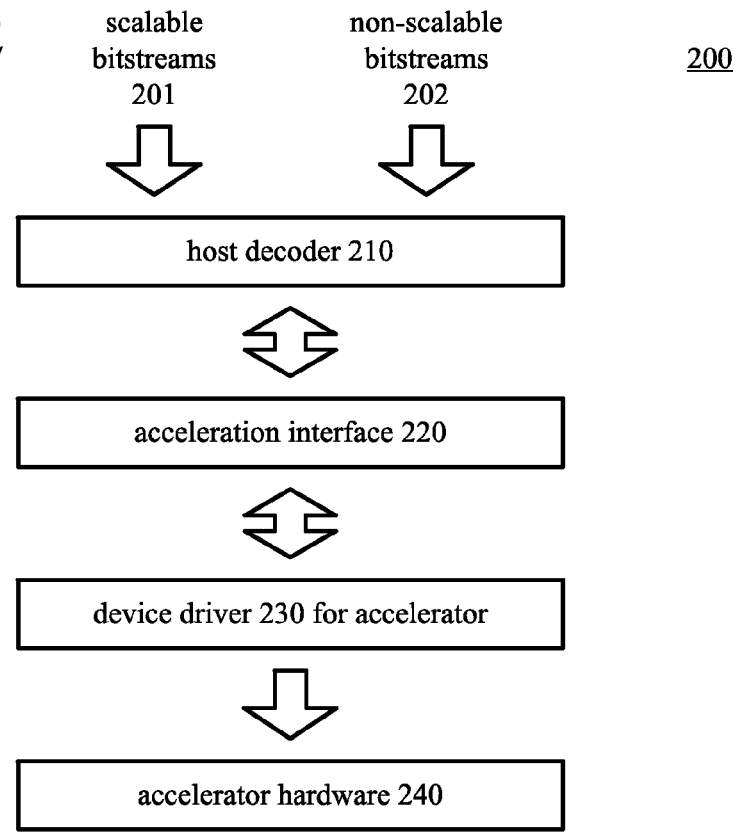
FIG. 2 is a diagram of an architecture for hardware-accelerated decoding of scalable bitstreams and/or non-scalable bitstreams.

FIG. 2 shows a simplified architecture (200) for hardware-accelerated decoding. The architecture includes a host decoder (210), an accelerator interface (220), a device driver (230) for an accelerator and accelerator hardware (240) for the accelerator. The device driver (230) and accelerator hardware (240) collectively provide functionality for the accelerator. The accelerator hardware (240) can be, for example, one or more GPUs or special-purpose decoding hardware.

The host decoder (210) receives one or more scalable video bitstreams (201) and/or one or more non-scalable bitstreams (202). The host decoder (210) controls overall decoding and can also perform some decoding operations using a host CPU. The host decoder (210) signals control information (e.g., picture parameters, macroblock parameters) and other data to the device driver (230) for the accelerator hardware (240) across an acceleration interface (220). Typically, the host decoder is implemented as user-mode software.

To the host decoder (210), the acceleration interface (220) provides a consistent interface to accelerator, regardless of the provider of the accelerator. Conversely, to an accelerator, the acceleration interface (220) provides a consistent interface to a host decoder, regardless of the provider of the host decoder. The details of the acceleration interface (220) depend on implementation. For example, the acceleration interface (220) is exposed to the host decoder (210) as an application programming interface ("API"), and the device driver (230) associated with the accelerator is exposed through a device driver interface ("DDI"). In an example interaction, the host decoder (210) fills a buffer with instructions and data then calls a method of the interface (220) to alert the device driver (230) through the operating system. The buffered instructions and information, opaque to the operating system, are passed to the device driver (230) by reference, and video information is transferred to memory of the accelerator hardware (240) if appropriate. While a particular implementation of the API and DDI may be tailored to a particular operating system or platform, in some cases, the API and/or DDI can be implemented for multiple different operating systems or platforms.

In order to impose consistency in the format, organization and timing of the information passed between the host decoder (210) and accelerator, an interface specification for the acceleration interface (220) can define a protocol for instructions and information for decoding according to a particular video decoding standard or product. The host decoder (210) follows specified conventions when putting instructions and information in buffers. The device driver (230) retrieves the buffered instructions and information according to the specified conventions and (with the accelerator hardware (240)) performs decoding appropriate to the standard or product. Thus, an interface specification for a specific standard or product is adapted to the particular bitstream syntax and semantics of the standard/product.

For example, in an implementation for hardware-accelerated AVC/SVC decoding according to the H.264 standard, the acceleration interface (220) extends an interface specification for hardware-accelerated H.264/AVC decoding. For additional details about the interface specification for hardware-accelerated H.264/AVC decoding, see the document entitled "DirectX Video Acceleration Specification for H.264/AVC Decoding." For hardware-accelerated AVC/SVC decoding according to the H.264 standard, where possible the interface specification uses the same basic call patterns, data flow, data structures, etc. as the interface specification for H.264/AVC decoding. The main differences, as explained below, relate to reference picture handling and support of inter-layer prediction for SVC decoding. In alternative implementations, the accelerator interface (220) extends an interface specification for hardware-accelerated decoding according to another standard or format.

In general, the accelerator hardware (240) supports decoding of non-scalable bitstreams (201) and scalable bitstreams (202). For example, in the implementation for hardware-accelerated H.264 decoding, the accelerator hardware (240) supports decoding of certain H.264/AVC bitstreams as well as H.264/SVC bitstreams. In particular, the accelerator hardware (240) supports decoding of ordinary AVC bitstreams that conform to the profiles that can be used as the base layer in corresponding H.264/SVC profiles. So, accelerator hardware (240) that supports decoding for the Scalable Baseline profile also supports the decoding of bitstreams conforming to Constrained Baseline profile. Similarly, accelerator hardware (240) that supports decoding for the Scalable High profile also supports the decoding of bitstreams conforming to the Constrained Baseline, Main and High profiles. During decoding, the host decoder can switch between SVC decoding of an SVC bitstream and AVC decoding of an AVC bitstream. In alternative implementations, the accelerator hardware (240) supports decoding of non-scalable bitstreams according to another standard or format, as well as decoding of scalable bitstreams according to the other standard or format or scalable video coding extensions thereof.

The division of decoding operations between the host decoder (210) and the accelerator depends on implementation, and it can vary for different acceleration profiles. In one acceleration profile, for example, the host decoder (210) performs picture extent discovery and basic bitstream parsing tasks, manages decoded picture buffer ("DPB") state for coded pictures and base layer reference pictures, prepares reference picture lists, performs reference picture marking and base reference picture marking, parses the sequence parameter set extensions, picture parameter set extensions, slice headers and prefix NAL units, handles reference picture list initialization and reordering, and handles processing of supplemental enhancement information messages. The remaining decoding functions such as variable length decoding, inverse frequency transform, motion compensation, intra prediction, loop filtering and post-processing are offloaded to the accelerator. Thus, the accelerator performs off-host parsing to retrieve syntax elements of the macroblock level and derives the variables of the reference layer representation for inter-layer motion compensation. When inter-layer intra prediction is used, the accelerator reconstructs the co-located intra signal of the reference layer. If the reference and target layer have different resolutions, the accelerator upsamples the co-located reference layer data. For decoding of video encoded using scalable video coding, accelerator-side modifications primary relate to header format issues, inter-layer motion compensation and increased memory requirements. The accelerator tracks sequential dependencies between the commanded decoding operations—such that read operations used in prediction processes are not performed until the write operations to fill the frame buffer with the correct decoded data have been completed. Alternatively, for a different acceleration profile, the host decoder (210) performs more decoding tasks instead of the accelerator, or the accelerator performs certain additional tasks otherwise performed by the host decoder (210).

Also, a host decoder (210) can work with an accelerator adapted for non-scalable decoding. To decode a scalable video bitstream using an accelerator adapted for non-scalable decoding, the host decoder (210) performs conversion processes. The host decoder (210) uses ordinary non-scalable data structures for parameters, settings, etc. for the compressed data of the base layer of the scalable video bitstream. Otherwise, the host decoder (210) converts the scalable bitstream to an ordinary bitstream such that the accelerator and its drivers treat the compressed data as an ordinary bitstream. When applicable, for an H.264 bitstream, the host decoder (210) may performs the rewriting process to take advantage of additional information in NAL units with nal_unit_type equal to 20, before sending the bitstream through the interface for AVC decoding.

III. Decoding of Scalable Video Bitstreams According to the H.264 Standard

Various examples of adaptations for hardware-accelerated decoding of scalable video bitstreams are explained below in the context of the H.264 standard. To illustrate such adaptations, certain features of decoding according to the H.264 standard are first summarized.

The H.264 standard describes syntax and decoding operations for non-scalable bitstreams for the H.264 standard (so called AVC bitstreams) and scalable bitstreams for the H.264 standard (so called SVC bitstreams). The syntax and decoding operations for SVC decoding are primarily described in Annex G of the H.264 standard. Various other sections of the H.264 standard, particularly including the main body of the standard and its Annexes A through E, describe syntax and decoding operations for AVC decoding.

In many respects the syntax for an SVC bitstream tracks the syntax of ordinary non-SVC bitstreams. For both, the data for a coded video sequence is structured into "access units" that are conveyed in the bitstream in decoding order (also called transmission order or coded order). An access unit contains one primary coded picture for a particular output time. Within an access unit, there may be a base layer that is formatted as an ordinary AVC coded picture and can be decoded by a non-SVC decoder. Within the same access unit or other access units, there may be one or more additional scalable layers, each representing an additional enhancement layer of a SVC encoded bitstream for the same output time.

A layer representation is a subset of NAL units within an access unit that are associated with base layer information or enhancement layer information for a given level of quality (i.e., same values of dependency identifier and quality identifier). A dependency representation includes one or more layer representations. The H.264 standard specifies various types of layers, including target layer, base quality layer, and reference layer. The target layer is the layer for a given target level of quality of reconstruction (i.e., associated with the largest value of quality identifier for all layer representations of the target dependency representation of the coded picture). The base quality layer is the layer for the base layer of video (i.e., associated with the quality identifier syntax element equal to 0). A reference layer for a particular layer of a coded picture is the layer that is used for inter-layer prediction. The reference layer representation belongs to the same access unit as the layer representation that uses it for inter-layer prediction.

A primary coded picture can be an enhancement layer picture (when enhancement layer data is present in the access unit) or a base layer picture (when no enhancement layer data is present in the access unit). The decoding of an access unit produces a decoded picture corresponding to the primary coded picture, and such decoding may also produce an associated stored reference base picture for use as a reference for decoding of other pictures. In general, in the context of the H.264 standard, a reference base picture is a reference picture that is obtained by decoding (1) a base quality layer with the nal_ref_idc syntax element not equal to 0 and the store_ref_base_pic_flag syntax element equal to 1, and (2) all layers of the coded picture that are referred to by inter-layer prediction in the base quality layer. A reference base picture is not a regular decoded picture, however, and it is not an output of the decoding process, but rather it may be used for inter prediction during subsequent decoding of P, B, EP, and EB slices.

In the H.264 standard, SVC supports three types of scalability: temporal scalability, quality (so-called SNR) scalability, and spatial scalability. When a SVC bitstream provides temporal scalability, the set of corresponding access units can be partitioned into a temporal base layer and one or more temporal enhancement layers so that the enhanced video has a higher frame rate than the base layer. AVC syntax basically supports temporal scalability with a reasonable number of temporal layers. SVC syntax additionally provides for signaling of temporal layers. Accelerators for AVC decoding can typically support SVC temporal scalability after a few changes have been incorporated to recognize NAL unit types for coded slices of enhancement layer data.

When a SVC bitstream provides spatial scalability, the set of corresponding access units can be partitioned into a spatial base layer with a lower spatial resolution, and one or more spatial enhancement layers that increase the spatial resolution of the decoded video. Inter-layer prediction mechanisms can be used, including tools for prediction of macroblock modes and associated motion parameters, prediction of motion parameters and prediction of residual differences. The use of inter-layer prediction is indicated by the syntax element no_inter_layer_pred_flag in SVC extension data of a NAL unit header. When no_inter_layer_pred_flag is 0, inter-layer prediction may be employed to improve coding efficiency. In SVC extension data of a slice header, the syntax element ref_layer_dq_id specifies the layer of the current coded picture that is used for inter-layer prediction of the enhancement-layer coded picture. When ref_layer_dq_id is not present, it is derived by rules specified in the H.264 standard.

When a SVC bitstream provides quality scalability, the set of corresponding access units can be partitioned into a quality base layer with a lower fidelity (e.g., encoded using a larger quantization parameter value) and one or more quality enhancement layers that increase the visual quality of the decoded video. When spatial resolution is unchanged, inter-prediction tools need not be used.

A reference picture is a picture that can be used for prediction during subsequent decoding, and a reference picture list is a list of the reference pictures that are available. The reference picture list is updated during decoding, as older reference pictures are no longer used for reference and new reference pictures are added. In SVC, the reference picture list construction process is modified according to the store_ref_base_pic_flag and use_ref_base_pic_flag syntax elements. When store_ref_base_pic_flag is 1, the reference base picture at the base layer representation (in addition to the target layer representation) may need to be stored in the DPB for inter prediction of subsequent content in decoding order. For each coded slice, the syntax element use_ref_base_pic_flag signals whether the reference picture for the base quality layer or target layer is employed for prediction.

IV. Innovations in Hardware-Accelerated Decoding of Scalable Video Bitstreams In several respects, hardware-accelerated decoding of scalable video bitstreams can be adapted for decoding of video encoded using scalable video coding. For example, a host decoder directs decoding with an accelerator such that the same decoding operations can be used for a picture to be decoded and its corresponding reference base picture, which is to be stored for use as a reference picture. Or, as another example, the host decoder groups data buffers associated with a layer representation and provides them to the accelerator, layer-after-layer in coded order. Or, as another example, the host decoder detects losses in units of encoded data and adjusts the target layer before providing encoded data to the accelerator. These and other examples of adaptations for hardware-accelerated decoding of scalable video bitstreams are explained below. The adaptations for hardware-accelerated decoding of scalable video bitstreams can be implemented for hardware-accelerated decoding of an H.264/SVC bitstream or hardware-accelerated decoding of video data organized according to another standard or format.

A. Reference Picture Handling in Hardware-Accelerated Decoding

In decoding of video encoded using scalable video coding, a decoder may need to store a reference base picture (at the base quality layer representation) in a DPB for inter-picture prediction of subsequent pictures in decoding order, in addition to storing a target decoded picture (at the target layer quality representation, which will be output) in the DPB. For hardware-accelerated decoding, an accelerator can follow the same procedure to decode the ordinary output picture as it follows to decode the reference base picture. In other words, the accelerator can handle a decoding request in essentially the same way whether it is for a picture in the target layer representation to be output or for a reference base picture to be used as a reference picture. Or, the host decoder can direct decoding with the accelerator such that redundant performance of certain decoding operations is avoided, as follows.

1. Generalized Techniques for Reference Picture Handling

Figure 3:
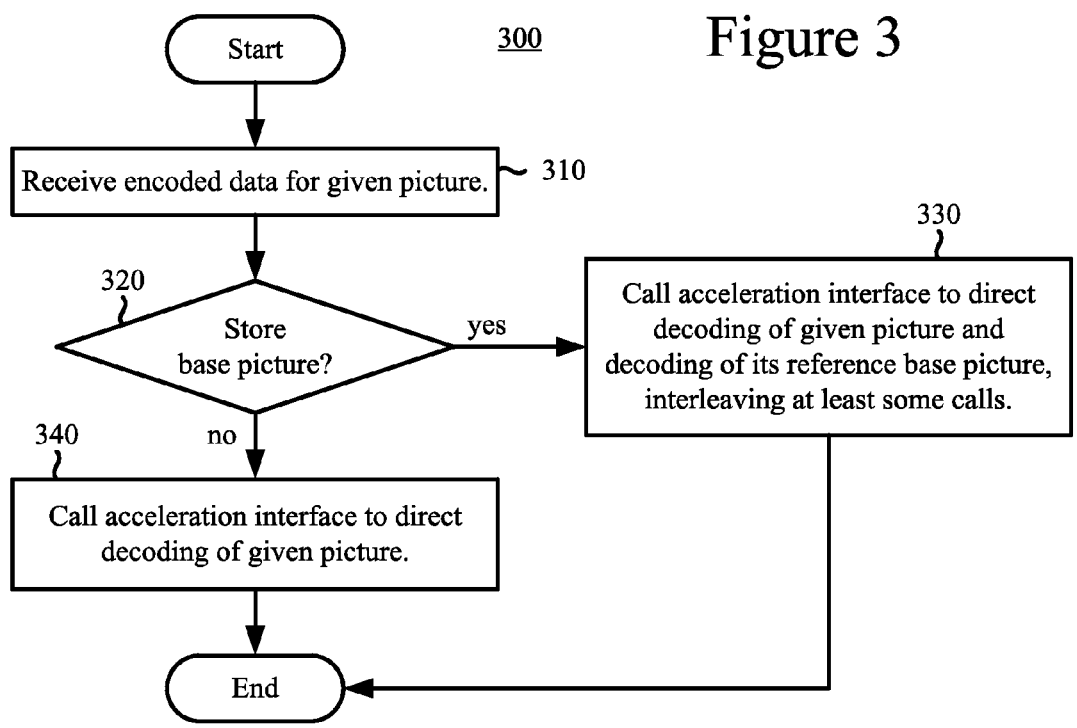
FIGS. 3 and 4 are flowcharts illustrating aspects of a generalized technique for reference picture handling during hardware-accelerated decoding of video encoded using scalable video coding.

FIG. 3 shows a generalized technique (300) for reference picture handling during hardware-accelerated decoding of video that was encoded using scalable video coding, from the perspective of a host decoder. For example, a host decoder such as the host decoder (210) in FIG. 2 or another host decoder performs the technique (300).

To start, the host decoder receives (310) encoded data for a given picture. In particular, the host decoder receives at least part of a bitstream for video data that was encoded using scalable video coding. For example, the video data is part of an H.264/SVC bitstream. Alternatively, the video data can be organized according to another standard or format for scalable video coding. The bitstream includes encoded data for the given picture to be decoded for output. The given picture has a base picture which may or may not be stored for use as a reference picture.

The host decoder checks (320) whether the base picture will be stored for use as a reference picture. For example, the host decoder checks one or more syntax elements in the scalable video bitstream to determine whether the base picture will be stored for use as a reference picture. In this way, the host decoder decides whether to initiate concurrent decoding of the given picture and a reference base picture.

If so (the base picture will be stored for use as a reference picture), the host decoder calls (330) the acceleration interface to direct decoding of the given picture and decoding of the reference base picture by the accelerator. In doing so, the host decoder interleaves at least some calls for the decoding of the given picture with at least some calls for the decoding of the reference base picture. Such interleaving facilitates recognition by the accelerator of opportunities to share operations between the decoding of the reference base picture and the decoding of the given picture. Otherwise (base picture not stored as reference picture), the host decoder calls (340) the acceleration interface to direct decoding of the given picture. Examples of call patterns for the calls (330, 340) to the acceleration interface are presented in section IV.A.2, below. Alternatively, the host decoder follows another call pattern when calling (330, 340) the acceleration interface.

Figure 4:
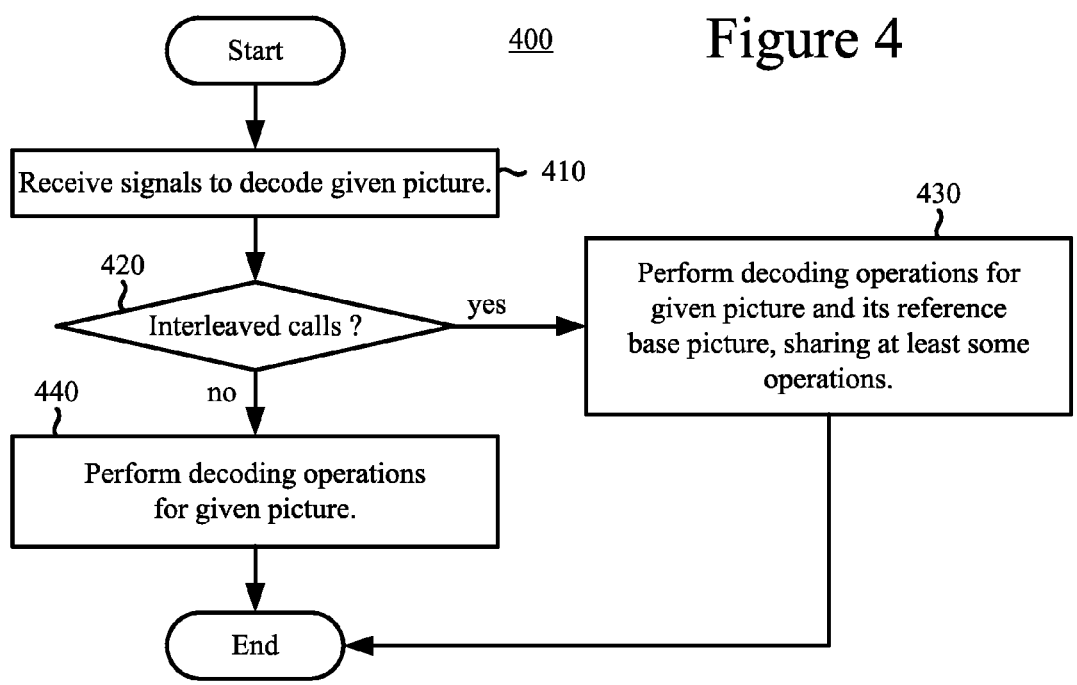

FIG. 4 shows a corresponding generalized technique (400) from the perspective of the accelerator. An accelerator including a device driver (230) and accelerator hardware (240) as shown in FIG. 2, or another accelerator, can perform the technique (400).

To start, the accelerator receives (410) signals to decode the given picture and evaluates (420) whether interleaved calls have been received for decoding of a corresponding reference base picture. If so, the accelerator performs (430) decoding operations for the given picture and reference base picture, using the same operations for at least some of the decoding for the given picture and the reference base picture. Otherwise, the accelerator (440) performs decoding operations for the given picture. In example implementations, the decoding operations are for H.264/SVC decoding. Alternatively, the decoding complies with another standard or format.

2. Example Call Patterns for Hardware-Accelerated Decoding

In general, a host decoder can call routines of an acceleration interface to direct decoding by an accelerator. For example, the host decoder calls a first routine to signal the start of one or more decoding operations by the accelerator. The host decoder calls a second routine to send one or more buffers of data to the accelerator. The host decoder calls a third routine to signal that the host decoder has sent all of the data needed for a particular first routine call, and the accelerator can then complete specified decoding operations. The call pattern can vary depending on whether the base picture will be stored as a reference picture.

If the base picture will be stored as a reference picture, the call pattern addresses decoding of a given picture and its corresponding reference base picture. The call pattern interleaves calls for the given picture and the reference base picture, which helps the accelerator recognize opportunities to use the same operations and results in decoding. The host decoder calls the first routine to signal initiation of the decoding of the reference base picture. In this call to the first routine, the host decoder can include a first index to a first output surface that will be used to store the reference base picture. The host decoder also calls the first routine to signal initiation of the decoding of the given picture. In this call to the first routine, the host decoder can include a second index to a second output surface that will be used to store the given picture after decoding. The host decoder calls the second routine one or more times to signal that at least some of the encoded data for the given picture is accessible to the accelerator. Typically, encoded data for the given picture in the scalable video bitstream has multiple layers in coded order in the bitstream. The multiple layers can include a target layer associated with the given picture and a reference layer associated with the reference base picture. For each layer in coded order, the host decoder stores encoded data for that layer in multiple buffers accessible to the accelerator, then calls the second routine to signal that the encoded data for the layer is accessible. The multiple buffers can include a picture parameters buffer, a slice control buffer and one or more bitstream data buffers. Then, the host decoder calls the third routine to signal that encoded data to be used in the decoding of the reference base picture has been provided, potentially including the first index to the first output surface as part of the call. The host decoder also calls the third routine to signal that encoded data to be used in the decoding of the given picture has been provided, potentially including the second index to the second output surface as part of the call.

On the other hand, if the base picture will not be stored as a reference picture, the call pattern simply addresses decoding of the given picture. The host decoder calls the first routine to signal initiation of the decoding of the given picture. Next, the host decoder calls the second routine one or more times to signal that at least some of the encoded data for the given picture is accessible to the accelerator. Then, the host decoder calls the third routine to signal that encoded data to be used in the decoding of the given picture has been provided.

3. Reference Picture Handling for H.264/SVC Decoding

This section describes example implementations of the techniques (300, 400) shown in FIGS. 3 and 4 for hardware-accelerated decoding of H.264/SVC video. For such decoding, the host decoder checks the store_ref_base_pic_flag syntax element. When the store_ref_base_pic_flag syntax element is equal to 1, the host decoder determines whether decoding and storage of a reference base picture is necessary. If so, the host decoder requests that the accelerator decode the current coded picture and also decode the reference base picture associated with the current picture, for use as a reference picture.

In this situation, the accelerator outputs values for two surfaces—one surface for the decoded picture for output, and one surface for the reference base picture. Reference base pictures are stored in the DPB, and the size of the DPB in SVC decoding has the same constraints as in ordinary AVC decoding. Thus, the memory requirement for reference pictures in hardware-accelerated SVC decoding is approximately the same as the memory requirement for hardware-accelerated AVC decoding.

The interface specification for hardware-accelerated H.264/AVC decoding specifies the basic sequence of operations for hardware-accelerated H.264/AVC decoding, including calls to BeginFrame, Execute and EndFrame routines of the acceleration interface. The host decoder calls the BeginFrame routine to signal the start of one or more decoding operations by the accelerator, which will cause the accelerator to write data into an uncompressed surface buffer specified in the call to the BeginFrame routine. The host decoder fills one or more buffers with parameters and other control information, encoded data for slices, etc. The host decoder calls the Execute routine to send the buffer(s) of data to the accelerator. The operations to be performed by the accelerator can be specified as a parameter to the call or in a data structure passed to the accelerator. The host decoder calls the EndFrame routine to signal that the host decoder has sent all of the data needed for a particular BeginFrame call, and the accelerator can then complete the specified operations.

For SVC decoding, to decode a reference base picture, the accelerator can follow the same procedure as decoding an ordinary output picture. In other words, it can be transparent to the accelerator whether a decoding request corresponds to a coded picture in the target layer representation or a reference base picture. The host decoder can perform the BeginFrame-Execute-EndFrame call sequence for the target output picture, then simply repeat the call sequence for the reference base picture, but that would involve redundant decoding operations.

To avoid such redundant operations, the accelerator can share decoding operations between decoding of the reference base picture and target output picture, where appropriate. For example, when the generation and storage of a reference base picture is signaled for the base layer (with nal_ref_idc is not equal to 0 and store_ref_base_pic_flag is equal to 1), the host decoder interleaves calls for the reference base picture and the decoded picture. Also, an additional parameter is specified indicating where to store the surface for the reconstructed reference base picture. The host decoder calls the BeginFrame routine with an index of an output surface associated with the reference base picture. The host decoder also calls the BeginFrame routine with an index of an output surface associated with the picture to be decoded for output. Next, the host decoder calls the Execute routine with one or more data buffers in accordance with appropriate constraints (described below) on buffer type, buffer sequence, and ordering by coded order. Then, the host decoder calls the EndFrame routine with the index of the output surface associated with the reference base picture, and the host decoder also calls the EndFrame routine with the index of the output surface associated with the picture to be decoded for output.

On the other hand, for hardware-accelerated SVC decoding when the generation and storage of a reference base picture is not needed, the host decoder uses the same calls as in hardware-accelerated H.264/AVC decoding. First, the host decoder calls the BeginFrame routine with an index of an output surface associated with the picture to be decoded for output. Second, the host decoder calls the Execute routine with one or more data buffers in accordance with appropriate constraints (described below) on buffer type, buffer sequence, and ordering by coded order. Finally, the host decoder calls the EndFrame routine with the index of the output surface associated with the picture to be decoded for output.

B. Inter-Layer Prediction Support in Hardware-Accelerated Decoding

In hardware-accelerated decoding of scalable video bitstreams, inter-layer prediction may be used for decoding a picture in a target layer representation. In this case, data corresponding to the reference layer representation is conveyed to the accelerator. A host decoder can provide encoded data for different layers to the accelerator in a way that helps the accelerator identify the layers with which the encoded data are associated.

1. Generalized Techniques for Inter-Layer Prediction Support

Figure 5:
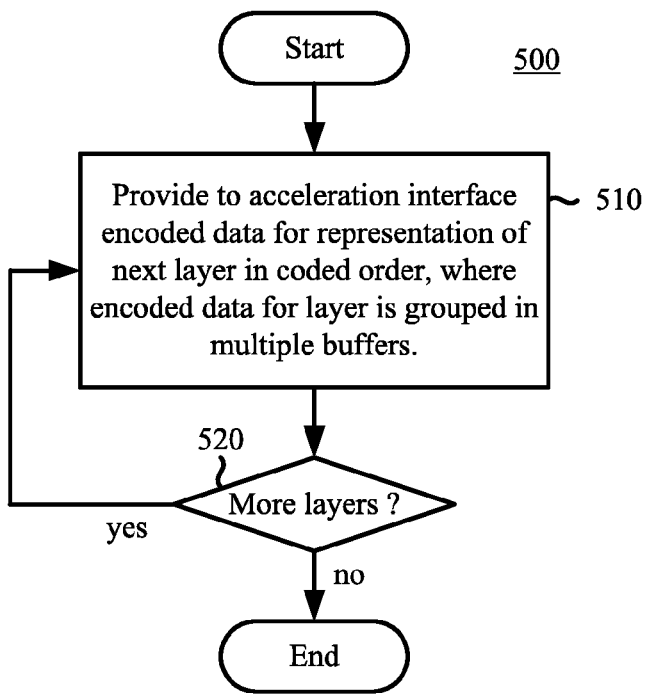
FIGS. 5 and 6 are flowcharts illustrating aspects of a generalized technique for providing encoded data for different layers in hardware-accelerated decoding of video encoded using scalable video coding.

FIG. 5 shows a generalized technique (500) for providing encoded data for different layers in hardware-accelerated decoding of video that was encoded using scalable video coding, from the perspective of a host decoder. For example, a host decoder such as the host decoder (210) in FIG. 2 or another host decoder performs the technique (500). In FIG. 5, a host decoder receives encoded data for a picture in multiple layers in coded order in a bitstream. The bitstream can be an H.264/SVC bitstream, or it can be bitstream organized according to another standard or format. For example, the multiple layers include a target layer and a reference layer. The multiple layers can also include one or more other layers used for inter-layer prediction. The picture can be a target picture to be decoded for output or a reference base picture to be stored for use as a reference picture.

For a given layer representation in the coded order, the host decoder provides (510) encoded data for that layer representation to the acceleration interface. In doing so, the host decoder groups the encoded data for the layer representation into multiple buffers. For example, the multiple buffers include a picture parameters buffer, one or more slice control buffers and one or more bitstream data buffers. Alternatively, the multiple buffers include other and/or additional buffers (e.g., a quantization matrix buffer). The host decoder checks (520) if there are any more layers and, if so, continues by providing (510) the encoded data for the next layer in coded order.

The phase in which the host decoder provides encoded data for the multiple layers to the acceleration interface can be preceded and followed by other calls to the acceleration interface. For example, before providing the encoded data, the host decoder calls one routine to initiate decoding of the picture. And, after providing the encoded data, the host decoder calls another routine to indicate that the encoded data has been provided. The accelerator can then initiate the performance of the video decoding operations.

Figure 6:
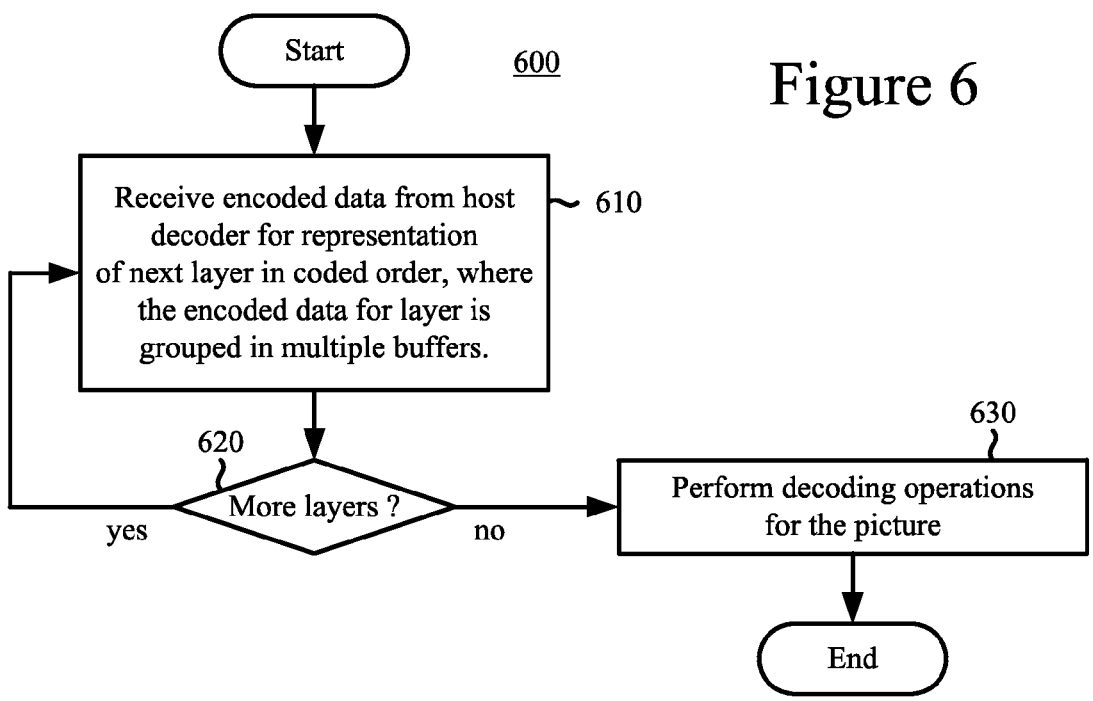

FIG. 6 shows a corresponding generalized technique (600) from the perspective of an accelerator. An accelerator including a device driver (230) and accelerator hardware (240) as shown in FIG. 2, or another accelerator, can perform the technique (600). In FIG. 6, an accelerator performs video decoding operations for a picture having encoded data in multiple layers in coded order in a bitstream. The picture can be a target picture to be decoded for output or a reference base picture to be stored for use as a reference picture. In example implementations, the decoding operations are for H.264/SVC decoding. Alternatively, the decoding complies with another standard or format.

To start, for each of the multiple layers, the accelerator receives (610) encoded data for the layer from a host decoder. The encoded data for the layer is grouped in multiple buffers accessible to the accelerator (e.g., a picture parameters buffer, one or more slice control buffer, one or more bitstream data buffers and/or a quantization matrix buffer). The accelerator checks (620) if there are any more layers and, if so, continues by receiving (610) the encoded data for the next layer in coded order. Thus, the accelerator receives the encoded data in the multiple buffers layer-after-layer in the coded order.

The phase in which the accelerator receives encoded data for the multiple layers can be preceded and followed by receipt of other signals. For example, before receiving the encoded data, the accelerator receives a first signal to initiate decoding of the picture. And, after receiving the encoded data, the accelerator receives a second signal to indicate that the encoded data has been provided by the host decoder. The accelerator can then initiate the performance of the video decoding operations in reaction to the second signal.

Returning to FIG. 6, if the encoded data has been received for all layers, the accelerator performs (630) video decoding operations using the encoded data for the picture. The accelerator can then store reconstructed values for the picture in an output surface.

2. Inter-Layer Prediction Support for H.264/SVC Decoding

This section describes example implementations of the techniques (500, 600) shown in FIGS. 5 and 6 for hardware-accelerated decoding of H.264/SVC video, in addition to describing other features of hardware-accelerated decoding of H.264/SVC video. For such decoding, when the syntax element no_inter_layer_pred_flag is 0, inter-layer prediction may be used for decoding a coded slice in the target layer. In this case, encoded data corresponding to the coded slices in the reference layer are conveyed to the accelerator. The reference layer of the current coded picture (to be used for inter-layer prediction of the enhancement layer of the current coded picture) is signaled through the slice header syntax element ref_layer_dq_id.

When the long slice control data structure is used (see section IV.B.3, below), the host decoder parses the slice header to retrieve ref_layer_dq_id, or derives ref_layer_dq_id when it is not present. The host decoder sends picture parameters, slice control parameters, and bitstream data associated with the coded slices in the reference layer to the accelerator, in addition to sending such data for the coded slices in the target layer to the accelerator. The variable MinNoInterLayerPredFlag is set equal to the minimum value of no_inter_layer_pred_flag for the slices of the layer representation. The host decoder need not send the reference layer data to the accelerator if MinNoInterLayerPredFlag is 1.

When the short slice control data structure is used (see section IV.B.3, below), the host decoder parses the slice header in the target layer, in the reference layer, and in other layers that are used for inter prediction. The host decoder also performs DPB management for picture output, picture deletion, reference picture marking/unmarking, etc. The host decoder still uses the MinNoInterLayerPredFlag variable.

In general, the host decoder makes calls to BeginFrame, Execute, and EndFrame routines of the acceleration interface to direct decoding of each picture in a scalable video bitstream, as well as decoding of its associated reference base picture (if appropriate). The host decoder fills data buffers associated with multiple layers—target layer, reference layer (when MinNoInterLayerPredFlag is 0) and other layers that are used for inter-layer prediction. Each layer has a picture parameters buffer, a quantization matrix buffer, one or more slice control buffer, and one or more bitstream data buffer. (There might be multiple slice control buffers and bitstream data buffers associated with one picture parameters buffer and one quantization matrix buffer, if one bitstream data buffer cannot hold the whole compressed picture).

To help the accelerator associate data buffers with the correct layer, the host decoder sends buffers to the accelerator between each BeginFrame/EndFrame pair based on the following two rules. First, each layer is associated with a group of four types of buffers: a picture parameters buffer, a quantization matrix buffer, one or more slice control buffers, and one or more bitstream data buffers. The picture parameters buffer stores picture parameters as described below, including parameters generic to AVC and SVC as well as SVC-specific parameters. The slice control buffer stores slice header parameters in a long or short format, including parameters generic to AVC and SVC as well as SVC-specific parameters. Second, groups of buffers are sent to the accelerator in decoding order.

Figure 7:
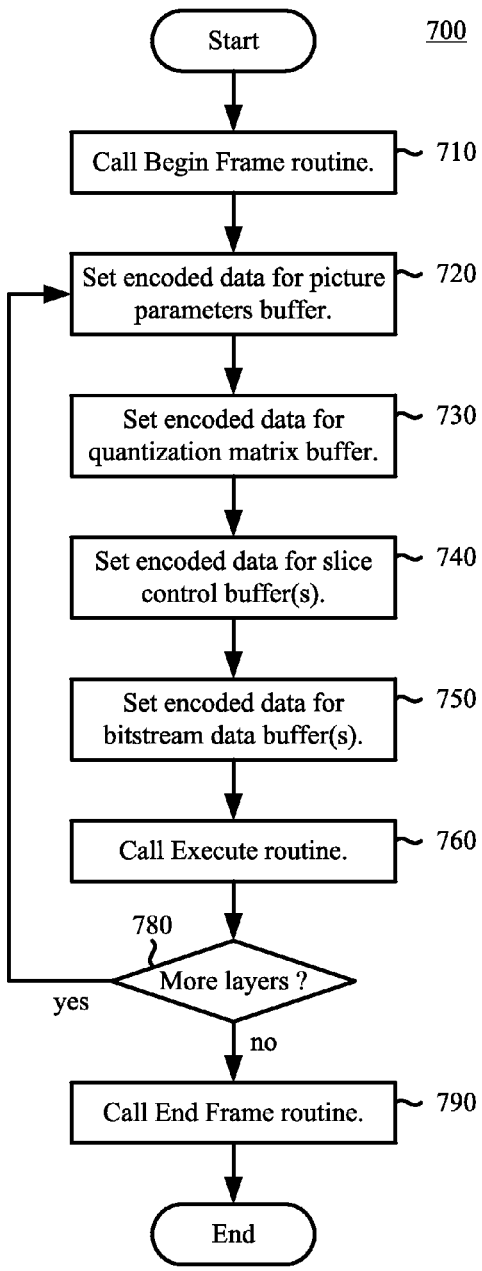
FIGS. 7 and 8 are flowcharts illustrating example call patterns and grouping of encoded data in hardware-accelerated decoding of video encoded using scalable video coding.

FIG. 7 shows a call pattern and grouping of encoded data in an example technique (700) for providing encoded data for layers of a picture in hardware-accelerated decoding of video that was encoded using scalable video coding, from the perspective of a host decoder. For example, a host decoder such as the host decoder (210) in FIG. 2 or another host decoder performs the technique (700).

A host decoder calls (710) the BeginFrame routine to signal the start of decoding for a frame. For a given layer, the host decoder sets (720) encoded data for a picture parameters buffer, filling the buffer with picture parameter set ("PPS") values (and possibly other values such as sequence parameter set values). The host decoder also sets (730) encoded data for a quantization matrix buffer, filing the buffer with values for a quantization matrix. The host decoder sets (740) encoded data for one or more slice control buffers (e.g., from slice header parameters) and sets (750) encoded slice data for one or more bitstream data buffers. The host decoder then calls (760) the Execute routine to provide the encoded data in the buffers to the acceleration interface. The host decoder checks (780) if there are any other layers of encoded data and, if so, repeats the operations of setting (720, 730, 740, 750) encoded data in the appropriate buffers for the next layer and calling (760) the Execute routine. When there are no more layers of encoded data, the host decoder calls (790) the EndFrame routine to signal that decoding can begin for the frame (that is, that encoded data for all layers has been provided).

Thus, buffers are filled and passed to the accelerator for the respective layers in the order that layers appear in the bitstream of encoded data. For example, buffers are filled and passed for a base layer, then filled and passed for a first enhancement layer, then filled and passed for a second enhancement layer, and so on, up to the target layer.

Figure 8:
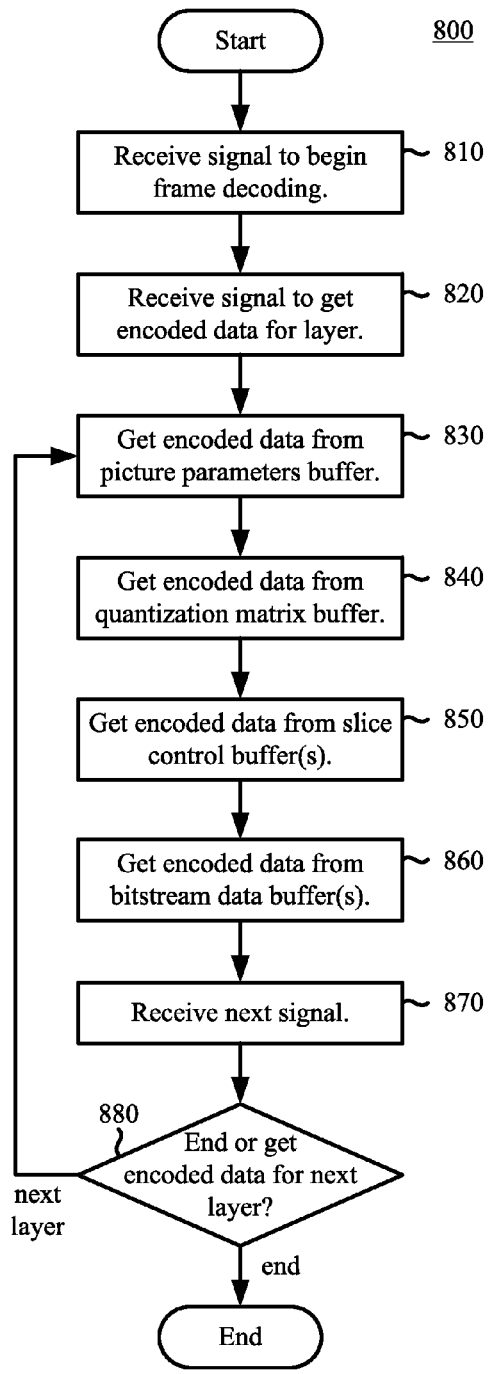

FIG. 8 shows a call pattern and grouping of encoded data in a corresponding example technique (800) from the perspective of an accelerator. An accelerator including a device driver (230) and accelerator hardware (240) as shown in FIG. 2, or another accelerator, can perform the technique (800).

An accelerator receives (810) a signal to start of decoding for a frame, then receives (820) a signal to get encoded data. For a given layer, the accelerator gets (830) encoded data for a picture parameters buffer, gets (840) encoded data for a quantization matrix buffer, gets (850) encoded data for one or more slice control buffers and gets (860) encoded slice data for one or more bitstream data buffers. The accelerator receives (870) the next signal and checks (880) whether to continue by getting encoded data for the next layer. If so, the accelerator repeats the operations of getting (830, 840, 850, 860) encoded data in the appropriate buffers for the next layer. When there are no more layers of encoded data, the accelerator begins decoding for the frame.

3. Extensions of Picture Parameter Structures for H.264/SVC Decoding

In the example implementations for hardware-accelerated decoding of H.264/SVC video, for each of the multiple layers, a picture parameters buffer stores parameters for a picture parameter structure. In general, the picture parameters buffer stores various parameters used for AVC decoding as well as SVC-specific parameters. For example, the picture parameter structure includes a list of buffer surfaces and a list of multiple values, each of the multiple values indicating whether a corresponding reference picture in the list of buffer surfaces is a reference base picture or decoded picture.

The format for picture parameters in the picture parameters buffer can extend the format for picture parameters in the interface specification for hardware-accelerated H.264/AVC decoding. For example, in addition to the parameters and flags specified for hardware-accelerated H.264/AVC decoding, the host decoder sends picture parameters as shown in the format definition (900) of FIGS. 9a and 9b to the accelerator. (In FIG. 9a, "Section 4.0" refers to the data structure format for picture parameters specified in section 4.0 of the specification "DirectX Video Acceleration Specification for H.264/AVC Decoding.") Thus, the host decoder creates and fills a DXVA_PicParams_H264_SVC structure for each coded picture, containing the parameters specified in a DXVA_PicParams_H264 structure as well as some additional parameters. As part of the picture parameter data structure signaled to the accelerator, in addition to parameters parsed from a PPS in the bitstream, the host decoder can include parameters parsed from a sequence parameter set in the bitstream, parameters parsed from a NAL unit header in the bitstream, and/or parameters parsed from slice headers in the bitstream (e.g., where such slice header parameters are the same across all slices of a layer representation).

Among parameters in the DXVA_PicParams_H264 structure, the parameter CurrPic now specifies an uncompressed destination surface as follows.

| Value | Description |
| --- | --- |
| Index associated with the uncompressed destination surface that contains the decoded picture | The current picture parameters buffer is referenced by one or more slice control buffers associated with the target layer representation |
| Index associated with the uncompressed destination surface that contains the reference base picture | The current picture parameters buffer is referenced by one or more slice control buffers associated with the base quality layer representation with the nal_ref_idc syntax element not equal to 0 and the store_ref_base_pic_flag syntax elements equal to 1 |
| Hexadecimal indicator value 0xFF | Otherwise |

The parameter RefBasePicFlag contains a list of 16 values. For a given position in RefBasePicFlag, a 1 indicates that the corresponding reference picture in RefFrameList is a reference base picture, and a 0 indicates that the corresponding reference picture in RefFrameList is a picture decoded for output.

RefFrameList contains a list of 16 uncompressed frame buffer surfaces. Each buffer surface contains either a decoded picture or a reference base picture. Entries that will not be used for decoding the current picture (or any subsequent picture) are indicated by setting bPicEntry to 0xFF. Otherwise, the entry may be used as a reference surface for decoding the current picture or a subsequent picture (in decoding order). A reference base picture may have the same PicOrderCnt value as its associated decoded picture, but the RefBasePicFlag value of the reference base picture is 1, while the RefBasePicFlag value of the decoded picture is 0. Surfaces that correspond to pictures currently marked as "used for reference" appear in the RefFrameList array. Non-reference surfaces (those which only contain pictures for which the value of RefPicFlag was 0 when the picture was decoded) do not appear in RefFrameList for a subsequent picture. In addition, surfaces that contain only pictures marked as "unused for reference" do not appear in RefFrameList for a subsequent picture.

The flag ShiftXYis16Flag has a value of 0 or 1. A value of 1 indicates resampling precision is 16, and a value of 0 indicates resampling precision is calculated based on the resolution for the reference layer representation.

The flag NextLayerSpatialResolutionChangeFlag indicates the derived variable SpatialResolutionChangeFlag of the layer representation for which (a) ref_layer_dq_id is equal to DQId of the current layer representation (when the value of LayerType is 1), or (b) DQId is less than and closest to the DQId of the current layer representation (when the value of LayerType is 5). The variable DQId is derived using the syntax elements dependency_id and quality_id. For example, DQId=(dependency_id<<4)+quality_id. If LayerType of the current layer representation is not equal to 1 or 5, NextLayerSpatialResolutionChangeFlag has no meaning, and the accelerator ignores its value.

The flag NextLayerMaxTCoeffLevelPredFlag indicates the derived variable MaxTCoeffLevelPredFlag of the layer representation for which (a) ref_layer_dq_id is equal to DQId of the current layer representation (when the value of LayerType is 1), or (b) DQId is less than and closest to the DQId of the current layer representation (when the value of LayerType is 5). If LayerType of the current layer representation is not equal to 1 or 5, the flag NextLayerMaxTCoeffLevelPredFlag has no meaning, and the accelerator ignores its value.

The flag DeblockingFilterMode indicates which deblocking filter mode is used to decide boundary filter strength when DQId is greater than 0, as shown in the following table.

| Value | Description |
|---|---|
| 0 | The boundary filter strength is decided as if profile_idc equal to 83 |
| 1 | The boundary filter strength is decided as if profile_idc equal to 86 |

When DQId is zero, DeblockingFilterMode has no meaning, and the accelerator ignores the value.

The field LayerType indicates information about the current layer representation, typically as compared to the previous picture, as shown in the following table.

| Value | Description |
|---|---|
| 0 | The current layer representation is the target layer representation, with the same DQId as the target layer representation of the previous picture |
| 1 | The current layer representation is the reference layer representation or is needed for deriving syntax elements, derived variables, or decoded samples of the reference layer representation. |
| 2 | The current layer representation is neither the target layer representation nor needed for inter-layer prediction. |
| 3 | The current layer representation is the target layer representation, and has dependency_id equal to the dependency_id of the target layer representation of the previous picture and quality_id not equal to the quality_id of the target layer representation of the previous picture |
| 4 | The current layer representation is the target layer representation, and has dependency_id not equal to the dependency_id of the target layer representation of the previous layer |
| 5 | The current layer representation is inferred to be the reference layer representation or to be needed for deriving syntax elements, derived variables, or decoded samples of the reference layer representation. |
| 6 | The current layer representation is inferred to be neither the target layer representation nor needed for inter-layer prediction. |
| 7 | The host decoder cannot readily determine this value because all the slices associated with the reference layer representation are missing, or because all the slices associated with a layer representation that is needed for deriving syntax elements, derived variables, or decoded samples of the reference layer representation are missing. |

Thus, a value 0 for LayerType indicates that the current layer representation is the target layer representation for the current picture. It also indicates the DQId of the current layer representation (target layer) is the same as the DQId of the target layer representation of the previous picture.

A value of 1 for LayerType indicates that the current layer representation is the reference layer representation, or is needed for deriving syntax elements, derived variables, or decoded samples of the reference layer representation. In this case, the accelerator may need to parse the slice bitstream for inter-layer motion compensation or reconstruct intra blocks.

A value of 2 for LayerType indicates that the current layer representation is neither of the target layer representation nor needed for inter-layer prediction. In this case, the accelerator need not do any particular processing in response, but the host decoder may send such coded slices to the accelerator, e.g., for potential error concealment purposes.

A value of 3 for LayerType indicates that the current layer representation is the target layer representation for the current picture, and that it has dependency_id equal to the dependency_id of the target layer representation of the previous picture, but also that it has quality_id not equal to the quality_id of the target layer representation of the previous picture. In this case, the accelerator performs complete decoding of the picture if only layer representations with LayerType 0, 1, 2 and/or 4 are present between a BeginFrame/EndFrame pair.

A value of 4 for LayerType indicates that the current layer representation is the target layer representation for the current picture, but that it has dependency_id not equal to the dependency_id of the target layer representation of the previous picture. The values 0, 3 and 4 shall not coexist between a BeginFrame/EndFrame pair. In some implementations, the host decoder always specifies a target layer—there is at least one layer representation with LayerType 0, 3 or 4 sent to the accelerator between a BeginFrame/EndFrame pair.

A value of 5 for LayerType indicates that the current layer representation is inferred to be the reference layer representation or needed for deriving syntax elements, derived variables, or decoded samples of the reference layer representation. A value of 6 indicates that the current layer representation is inferred to be neither the target layer representation nor needed for inter-layer prediction. The host decoder does not specify a value of 5 or 6 when a value of 1 or 2 is determinable for a layer representation. The host decoder infers a value 5 or 6 from, for example, LayerType of the layer representations of previous pictures with the same DQId.

A value of 7 for LayerType indicates that the host decoder cannot readily determine another value of LayerType, e.g., because all the slices associated with the reference layer representation are missing, or because all the slices associated with a layer representation that is needed for deriving syntax elements, derived variables, or decoded samples of the reference layer representation are missing. The host decoder does not specify a value of 7 for LayerType when a value of 0, 1, 2, 3 or 4 is determinable for a layer representation. Also, in general, the host decoder uses a value of 5 or 6 rather than 7, when LayerType 1 or 2 is indeterminate. Layer representations with LayerType equal to 7 cannot coexist with layer representations with LayerType equal to 5 or 6 between a BeginFrame/EndFrame pair.

In alternative implementations, a host decoder and accelerator can use other and/or additional values for LayerType.

NextLayerScaledRefLayerLeftOffset, NextLayerScaledRefLayerRightOffset, NextLayerScaledRefLayerTopOffset and NextLayerScaledRefLayerBottomOffset indicate horizontal and vertical cropping offsets, in units of samples, of the layer representation for which (a) ref_layer_dq_id is equal to DQId of the current layer representation (when the value of LayerType is 1), or (b) DQId is less than and closest to the DQId of the current layer representation (when the value of LayerType is 5). In other words, these four fields are equal to the values of variables ScaledRefLayerLeftOffset, ScaledRefLayerRightOffset, ScaledRefLayerTopOffset, and ScaledRefLayerBottomOffset, respectively, of that layer representation. If LayerType of the current layer representation is not equal to 1 or 5, these four fields have no meaning, and the accelerator ignores their values.

The fields NextLayerPicWidthinMbs, NextLayerPicHeightinMbs, NextLayerDisableInterLayerDeblockingFilterIdc, NextLayerInterLayerSliceAlphaC0OffsetDiv2 and NextLayerInterLayerSliceBetaOffsetDiv2 facilitate upsampling processes when spatial scalability is used.

In particular, the fields NextLayerPicWidthInMbs and NextLayerPicHeightInMbs indicate the width and height, in units of macroblocks, of the layer representation for which (a) ref_layer_dq_id is equal to DQId of the current layer representation (when the value of LayerType is 1), or (b) DQId is less than and closest to the DQId of the current layer representation (when the value of LayerType is 5). If LayerType of the current layer representation is not equal to 1 or 5, these two fields have no meaning, and the accelerator ignores their values.

The field NextLayerDisableInterLayerDeblockingFilterIdc indicates the syntax element disable_inter_layer_deblocking_filter of the layer representation for which (a) ref_layer_dq_id is equal to DQId of the current layer representation (when the value of LayerType is 1), or (b) DQId is less than and closest to the DQId of the current layer representation (when the value of LayerType is 5). If LayerType of the current layer representation is not equal to 1 or 5, NextLayerDisableInterLayerDeblockingFilterIdc has no meaning, and the accelerator ignores its value.

The field NextLayerInterLayerSliceAlphaC0OffsetDiv2 indicates the syntax element inter_layer_slice_alpha_c0_offset_div2 of the layer representation for which (a) ref_layer_dq_id is equal to DQId of the current layer representation (when the value of LayerType is 1), or (b) DQId less than and closest to the DQId of the current layer representation (when the value of LayerType is 5). If LayerType of the current layer representation is not equal to 1 or 5, NextLayerInterLayerSliceAlphaC0OffsetDiv2 has no meaning, and the accelerator ignores its value.

The field NextLayerInterLayerSliceBetaOffsetDiv2 indicates the syntax element inter_layer_slice_beta_offset_div2 of the layer representation for which (a) ref_layer_dq_id is equal to DQId of the current layer representation (when the value of LayerType) is 1, or (b) DQId is less than and closest to the DQId of the current layer representation (when the value of LayerType is 5). If LayerType of the current layer representation is not equal to 1 or 5, NextLayerInterLayerSliceBetaOffsetDiv2 has no meaning, and the accelerator ignores its value.

Otherwise, the fields of the picture parameters correspond to the AVC or SVC syntax elements or derived variables of the same name, and have the same semantic as in the H.264 standard. Some of the fields set in the picture parameters buffer (as shown in FIGS. 9a and 9b) actually correspond to slice header syntax elements, but are set to be the same across all slices of a layer. If a syntax element is not present in the bitstream and has no inferred value according to the H.264 standard, the host decoder set its value to 0.

4. Extensions of Slice Control Data Structures for H.264/SVC Decoding

In the example implementations for hardware-accelerated decoding of H.264/SVC video, for each of the multiple layers, a slice control buffer stores a slice parameters. In general, the slice control buffer stores various parameters used for AVC decoding as well as SVC-specific parameters. In particular, the slice control buffer stores a slice header including multiple slice control parameters for decoding.

The format for slice control data structures can extend the format for slice control data structures in the interface specification for hardware-accelerated H.264/AVC decoding. The slice control data structure can have a long form or a short form. For example, FIG. 10 shows the format definition (1000) for a long-form version of the slice control data structure, and FIG. 11 shows the format definition (1100) for a short-form version of the slice control data structure. (In FIGS. 10 and 11, "Section 6.1" refers to the long-form and short-form data structure formats for slice control specified in section 6.1 of the specification "DirectX Video Acceleration Specification for H.264/AVC Decoding.")

In addition to the parameters and flags specified for hardware-accelerated H.264/AVC decoding, the host decoder sends slice control parameters as shown in FIG. 10 or 11 to the accelerator. The host decoder creates and fills a DXVA_Slice_H264_SVC_Long or DXVA_Slice_H264_SVC_Short structure for each coded picture, which contains the parameters specified in the DXVA_Slice_H264_Long or DXVA_Slice_H264_Short structure as well as some additional slice control parameters.

If wBadSliceChopping is 0 or 1, the field BSNALunitDataLocation locates the NAL unit with nal_unit_type equal to 1, 5, or 20 for the current slice. (The current slice is the slice associated with a given slice control data structure.) The value is a byte offset, from the start of the bitstream data buffer, of the first byte of the start code prefix in the byte stream NAL unit that contains the NAL unit with nal_unit_type equal to 1, 5 or 20. The host decoder does not include any NAL units with values of nal_unit_type other than 1, 5, and 20 in the bitstream data buffers. The accelerator allows any NAL units to be present, but ignores their content if nal_unit_type is other than 1, 5, and 20.

The field SliceGroupMap (in the picture parameters structure) generally follows the definition for DXVA decoding of AVC bitstreams, but a few additional constraints apply. When num_slice_groups_minus 1 is 0, the host decoder cannot truncate the picture parameters data buffer before the SliceGroupMap array. In this case, the host decoder can set the corresponding array members to zero, and the accelerator ignores the contents of the SliceGroupMap array.

In general, the remaining fields of the DXVA_Slice_H264_SVC_Long and DXVA_Slice_H264_SVC_Short structures correspond to the SVC syntax elements or SVC variables of the same name, and they affect the decoding process as specified in the H.264 standard. If a syntax element is not present in the bitstream and has no inferred value according to the H.264 standard, the host decoder set its value to the default as defined in the H.264 standard.

C. Error Handling in Hardware-Accelerated Decoding of Scalable Bitstreams

In hardware-accelerated decoding of scalable video bitstreams, the host decoder can facilitate error handling by the accelerator when the host decoder detects loss of units of encoded data for a target layer or reference layer used by the target layer.

1. Generalized Techniques for Error Handling

Figure 12:
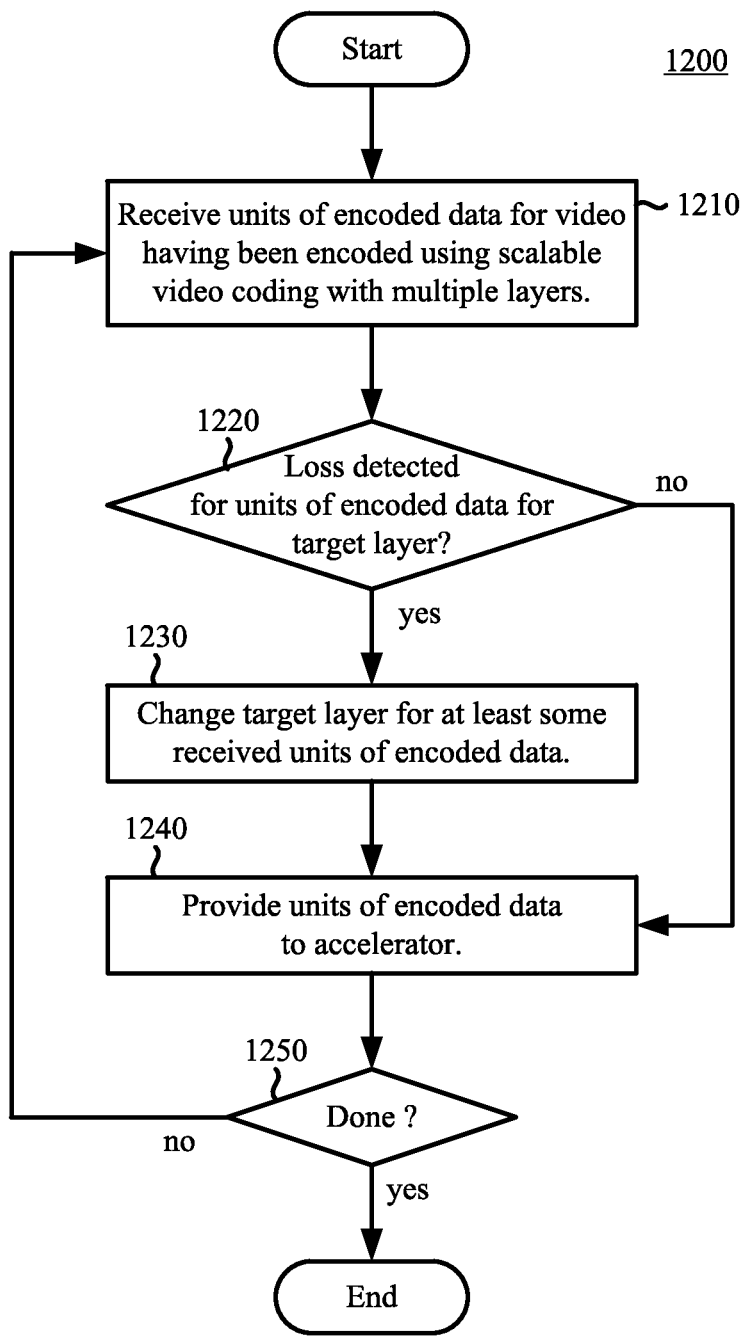
FIG. 12 is a flowchart illustrating a generalized technique for error handling in hardware-accelerated decoding of video encoded using scalable video coding.

FIG. 12 shows a generalized technique (1200) for error handling in hardware-accelerated decoding of a scalable video bitstream, from the perspective of a host decoder. For example, a host decoder such as the host decoder (210) in FIG. 2 or another host decoder performs the technique (1200). In example implementations, the bitstream is an H.264/SVC bitstream, and the host decoder facilitates error handling for H.264/SVC decoding. In alternative implementations, the bitstream is organized according to another standard or format, and the host decoder facilitates error handling for decoding according to that other standard or format.

The host decoder receives (1210) units of encoded data for video that was encoded using scalable video coding with multiple layers. For example, the units of encoded data are units of slice data. Alternatively, the units of encoded data are units of picture data, macroblock data or data for some other level of organization of video. The host decoder checks (1220) for loss of units of encoded data used for reconstruction of a target layer of the multiple layers. For example, the host decoder checks for lost units of encoded data for the target layer and any layers used for reference in inter-layer prediction.

If loss of units is detected, the host decoder changes (1230) the target layer for at least some of the received units of encoded data. For example, the host decoder alters layer type syntax elements in the units of encoded data. Alternatively, the host decoder changes the target layer in some other way. The host decoder then provides (1240) the units of encoded data with the changed target layer to an accelerator.

On the other hand, if no loss of units is detected, the host decoder simply provides (1240) the units of encoded data with the original target layer to the accelerator. The host decoder checks (1250) whether to continue decoding and, if so, receives the next units of encoded data.

2. Error Handling for H.264/SVC Decoding

This section describes an example implementation of the technique (1200) shown in FIG. 12 for hardware-accelerated decoding of H.264/SVC video. For such decoding, when NAL units are communicated over an unreliable channel, NAL units may be lost during transport. In this situation, the host decoder can perform error handling procedures to address losses in the target layer representation and/or reference layer representation.

When the long format for slice data structure is used, for example, the host decoder has information about dependency layers, reference frame lists and reference picture lists. If losses involve NAL units in the target layer representation or NAL units that will be used for reference for inter-layer prediction, the host decoder can change the target layer representation to a layer representation associated with smaller ref_layer_dq_id, then send coded slices associated with the new reference and target layers to the accelerator. The accelerator can detect this due to the change of ref_layer_dq_id corresponding to coded slices with LayerType equal to 0, but can proceed with decoding nonetheless.

Or, when the short format for slice data structure is used or when the host decoder leaves error handling to the accelerator, the host decoder can change or keep the target layer, but send all coded slices with smaller ref_layer_dq_id to the accelerator. The accelerator can then utilize the data sent from the host decoder for error concealment purposes as necessary.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A tangible computer-readable medium storing computer-executable instructions for causing a computing system, when programmed thereby, to perform scalable video decoding control comprising:
receiving at least part of a bitstream for video data having been encoded using scalable video coding, the bitstream including encoded data for a given picture to be decoded for output, the given picture having a reference base picture to be decoded and stored for use as a reference picture but not output; and
with a host decoder, calling an acceleration interface to direct decoding of the given picture and decoding of the reference base picture by an accelerator, including interleaving, according to a call pattern, at least some calls for the decoding of the reference base picture with at least some calls for the decoding of the given picture, wherein, according to the call pattern, the calling the acceleration interface includes:
before calling a second routine for the given picture:
calling a first routine to signal initiation of the decoding of the reference base picture; and
calling the first routine to signal initiation of the decoding of the given picture;
calling the second routine one or more times to signal that at least some of the encoded data for the given picture is accessible to the accelerator; and
after the calling the second routine for the given picture:
calling a third routine to signal that encoded data to be used in the decoding of the reference base picture has been provided; and
calling the third routine to signal that encoded data to be used in the decoding of the given picture has been provided.

2. The computer-readable medium of claim 1 wherein the interleaving facilitates recognition by the accelerator of opportunities to share operations between the decoding of the reference base picture and the decoding of the given picture.

3. The computer-readable medium of claim 1 wherein, for the reference base picture, the calling the first routine and the calling the third routine include a first index to a first output surface associated with the reference base picture, and wherein, for the given picture, the calling the first routine and the calling the third routine include a second index to a second output surface associated with the given picture.

4. The computer-readable medium of claim 1 wherein the bitstream further includes encoded data for a next picture to be decoded for output, the next picture lacking a base picture to be stored for use as a reference picture, the scalable video decoding control further comprising:
calling the first routine to signal initiation of the decoding of the next picture;
calling the second routine one or more times to signal that the encoded data for the next picture is accessible to the accelerator; and
calling the third routine to signal that encoded data to be used in the decoding of the next picture has been provided.

5. The computer-readable medium of claim 1 wherein the scalable video decoding control further comprises:
deciding whether to initiate concurrent decoding of the given picture and the reference base picture;

if so, performing the calling the acceleration interface to direct the decoding of the given picture and the decoding of the reference base picture by the accelerator; and otherwise, calling the acceleration interface to direct the decoding of the given picture by the accelerator.

6. The computer-readable medium of claim 1 wherein the encoded data for the given picture has multiple layers in coded order in the bitstream, and wherein the calling the second routine one or more times includes, in the coded order, for each of the multiple layers:

storing encoded data for that layer in multiple buffers accessible to the accelerator; and calling the second routine to signal that the encoded data for that layer is accessible.

7. The computer-readable medium of claim 6 wherein the multiple layers include a target layer associated with the given picture and a reference layer associated with the reference base picture.

8. The computer-readable medium of claim 6 wherein the multiple buffers include a picture parameters buffer, a slice control buffer and one or more bitstream data buffers.

9. The computer-readable medium of claim 1 wherein the bitstream includes units of the encoded data for the given picture, wherein the encoded data for the given picture has multiple layers in coded order in the bitstream, and wherein the scalable video decoding control further comprises:

with the host decoder, detecting loss of units of encoded data used for reconstruction of a target layer of the multiple layers; and with the host decoder, changing the target layer for at least some of the units of the encoded data for the given picture, wherein the units of the encoded data with the changed target layer are provided to the accelerator.

10. The computer-readable medium of claim 9 wherein the units of the encoded data for the given picture are units of slice data, and wherein the lost units are for the target layer and/or for reference in inter-layer prediction.

11. The computer-readable medium of claim 9 wherein the changing comprises altering layer type syntax elements in the units of the encoded data for the given picture.

12. The computer-readable medium of claim 1 wherein the call pattern signals to the accelerator to avoid redundant performance of at least some operations between the decoding of the given picture and the decoding of the reference base picture.

13. A method comprising:

receiving at least part of a bitstream for video data having been encoded using scalable video coding, the bitstream including encoded data for a given picture to be decoded for output, the given picture having a reference base picture to be decoded and stored for use as a reference picture but not output; and with a host decoder, calling an acceleration interface to direct decoding of the given picture and decoding of the reference base picture by an accelerator, including interleaving, according to a call pattern, at least some calls for the decoding of the reference base picture with at least some calls for the decoding of the given picture, wherein, according to the call pattern, the calling the acceleration interface includes:

before calling a second routine for the given picture:

calling a first routine to signal initiation of the decoding of the reference base picture; and calling the first routine to signal initiation of the decoding of the given picture;

calling the second routine one or more times to signal that at least some of the encoded data for the given picture is accessible to the accelerator; and after the calling the second routine for the given picture:

calling a third routine to signal that encoded data to be used in the decoding of the reference base picture has been provided; and calling the third routine to signal that encoded data to be used in the decoding of the given picture has been provided.

14. The method of claim 13 wherein, for the reference base picture, the calling the first routine and the calling the third routine include a first index to a first output surface associated with the reference base picture, and wherein, for the given picture, the calling the first routine and the calling the third routine include a second index to a second output surface associated with the given picture.

15. The method of claim 13 wherein the method further comprises:

deciding whether to initiate concurrent decoding of the given picture and the reference base picture;

if so, performing the calling the acceleration interface to direct the decoding of the given picture and the decoding of the reference base picture by the accelerator; and otherwise, calling the acceleration interface to direct the decoding of the given picture by the accelerator.

16. The method of claim 13 wherein the encoded data for the given picture has multiple layers in coded order in the bitstream, and wherein the calling the second routine one or more times includes, in the coded order, for each of the multiple layers:

storing encoded data for that layer in multiple buffers accessible to the accelerator; and calling the second routine to signal that the encoded data for that layer is accessible.

17. The method of claim 16 wherein the multiple buffers include a picture parameters buffer, a slice control buffer and one or more bitstream data buffers.

18. The method of claim 13 wherein the bitstream includes units of the encoded data for the given picture, wherein the encoded data for the given picture has multiple layers in coded order in the bitstream, and wherein the method further comprises:

with the host decoder, detecting loss of units of encoded data used for reconstruction of a target layer of the multiple layers; and with the host decoder, changing the target layer for at least some of the units of the encoded data for the given picture, wherein the units of the encoded data with the changed target layer are provided to the accelerator.

19. The method of claim 13 wherein the call pattern signals to the accelerator to avoid redundant performance of at least some operations between the decoding of the given picture and the decoding of the reference base picture.

20. A computer system comprising a processor and memory, wherein the computer system implements a host decoder configured to:

receive at least part of a bitstream for video data having been encoded using scalable video coding, the bitstream including encoded data for a given picture to be decoded for output, the given picture having a reference base picture to be decoded and stored for use as a reference picture but not output; and call an acceleration interface to direct decoding of the given picture and decoding of the reference base picture by an accelerator, wherein the host decoder is configured to interleave, according to a call pattern, at least some calls for the decoding of the reference base picture with at least some calls for the decoding of the given picture, and wherein, according to the call pattern, the host decoder is configured to:
before calling a second routine for the given picture:
call a first routine to signal initiation of the decoding of the reference base picture; and
call the first routine to signal initiation of the decoding of the given picture;
call the second routine one or more times to signal that at least some of the encoded data for the given picture is accessible to the accelerator; and
after the calling the second routine for the given picture:
call a third routine to signal that encoded data to be used in the decoding of the reference base picture has been provided; and
call the third routine to signal that encoded data to be used in the decoding of the given picture has been provided.

21. The computer system of claim 20 wherein the host decoder is further configured to:
decide whether to initiate concurrent decoding of the given picture and the reference base picture;
if so, perform the calling the acceleration interface to direct the decoding of the given picture and the decoding of the reference base picture by the accelerator; and
otherwise, call the acceleration interface to direct the decoding of the given picture by the accelerator.

22. The computer system of claim 20 wherein the encoded data for the given picture has multiple layers in coded order in the bitstream, and wherein the host decoder is further configured to, as part of calling the second routine one or more times, in the coded order, for each of the multiple layers:
store encoded data for that layer in multiple buffers accessible to the accelerator; and
call the second routine to signal that the encoded data for that layer is accessible.

23. The computer system of claim 20 wherein the call pattern signals to the accelerator to avoid redundant performance of at least some operations between the decoding of the given picture and the decoding of the reference base picture.

24. A computer system comprising memory and an accelerator with accelerator hardware that supports decoding of at least part of a bitstream for video data having been encoded using scalable video coding, the bitstream including encoded data for a given picture to be decoded for output, the given picture having a reference base picture to be decoded and stored for use as a reference picture but not output, wherein the accelerator is configured to:
receive, through an acceleration interface, signals for multiple calls that a host decoder uses to direct decoding of the reference base picture and signals for multiple calls that the host decoder uses to direct decoding of the given picture, wherein at least some calls of the multiple calls that the host decoder uses to direct the decoding of the reference base picture are interleaved, according to a call pattern, with at least some calls of the multiple calls that the host decoder uses to direct the decoding of the given picture, and wherein, according to the call pattern, the accelerator is further configured to receive signals for:
before any calls to a second routine for the given picture:
a call to a first routine to indicate initiation of the decoding of the reference base picture; and
a call to the first routine to indicate initiation of the decoding of the given picture;
one or more calls to the second routine, each of the one or more calls indicating that at least some of the encoded data for the given picture is accessible to the accelerator;
after the one or more calls to the second routine for the given picture:
a call to a third routine to indicate that encoded data to be used in the decoding of the reference base picture has been provided; and
a call to the third routine to indicate that encoded data to be used in the decoding of the given picture has been provided; and
perform the decoding of the given picture and the decoding of the reference base picture.

25. The computer system of claim 24 wherein the accelerator is further configured to decide whether to initiate concurrent decoding of the given picture and the reference base picture.

26. The computer system of claim 24 wherein, for the reference base picture, the call to the first routine and the call to the third routine include a first index to a first output surface associated with the reference base picture, and wherein, for the given picture, the call to the first routine and the call to the third routine include a second index to a second output surface associated with the given picture.

27. The computer system of claim 24 wherein the call pattern signals to the accelerator to avoid redundant performance of at least some operations between the decoding of the given picture and the decoding of the reference base picture.

28. In an accelerator with accelerator hardware, a method of decoding at least part of a bitstream for video data having been encoded using scalable video coding, the bitstream including encoded data for a given picture to be decoded for output, the given picture having a reference base picture to be decoded and stored for use as a reference picture but not output, the method comprising:
receiving, through an acceleration interface, signals for multiple calls that a host decoder uses to direct decoding of the reference base picture and signals for multiple calls that the host decoder uses to direct decoding of the given picture, wherein at least some calls of the multiple calls that the host decoder uses to direct the decoding of the reference base picture are interleaved, according to a call pattern, with at least some calls of the multiple calls that the host decoder uses to direct the decoding of the given picture, and wherein, according to the call pattern, the received signals include:
before any calls to a second routine for the given picture:
a call to a first routine to indicate initiation of the decoding of the reference base picture; and
a call to the first routine to indicate initiation of the decoding of the given picture;
one or more calls to the second routine, each of the one or more calls indicating that at least some of the encoded data for the given picture is accessible to the accelerator;
after the one or more calls to the second routine for the given picture:
a call to a third routine to indicate that encoded data to be used in the decoding of the reference base picture has been provided; and a call to the third routine to indicate that encoded data to be used in the decoding of the given picture has been provided; and performing the decoding of the given picture and the decoding of the reference base picture.

29. The method of claim 28 wherein the call pattern signals to the accelerator to avoid redundant performance of at least some operations between the decoding of the given picture and the decoding of the reference base picture.

* * * * *